(12) United States Patent
Ishii et al.

(10) Patent No.: US 12,285,679 B2
(45) Date of Patent: Apr. 29, 2025

(54) COMPUTER-READABLE NON-TRANSITORY STORAGE MEDIUM HAVING GAME PROGRAM STORED THEREIN, GAME SYSTEM, GAME APPARATUS, AND GAME PROCESSING METHOD

(71) Applicant: Nintendo Co., Ltd., Kyoto (JP)

(72) Inventors: Yuya Ishii, Kyoto (JP); Susumu Ishihara, Kyoto (JP); Yusuke Shibata, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 307 days.

(21) Appl. No.: 18/119,710

(22) Filed: Mar. 9, 2023

(65) Prior Publication Data
US 2024/0100423 A1  Mar. 28, 2024

(30) Foreign Application Priority Data

Sep. 22, 2022  (JP) ................. 2022-151137

(51) Int. Cl.
*A63F 13/44* (2014.01)
*A63F 13/48* (2014.01)
(Continued)

(52) U.S. Cl.
CPC .............. *A63F 13/44* (2014.09); *A63F 13/48* (2014.09); *A63F 13/56* (2014.09); *A63F 13/58* (2014.09); *A63F 13/822* (2014.09)

(58) Field of Classification Search
CPC .... A63F 13/44–48; A63F 13/56; A63F 13/58; A63F 13/822
See application file for complete search history.

(56) References Cited

U.S. PATENT DOCUMENTS 8,145,702 B2 * 3/2012 Patterson .............. H04L 67/131
709/224
10,576,372 B2 * 3/2020 Franzas ................. A63F 13/833
(Continued)

FOREIGN PATENT DOCUMENTS

JP  2013-128586  7/2013
JP  2014-210078  11/2014
(Continued)

OTHER PUBLICATIONS

Jul. 30, 2024 Office Action issued in Japanese Patent Application No. 2022-151137, pp. 1-7 [machine translation included].

*Primary Examiner* — Omkar A Deodhar
(74) *Attorney, Agent, or Firm* — Nixon & Vanderhye PC

(57) ABSTRACT

A game using a user character is started on the basis of a first start instruction input. At a first timing after that, advancement of the game is finished, and advancement state data until then is transmitted to a server. On the basis of a second start instruction input from a user, a game that is based on advancement state data transmitted to the server by an information processing terminal of another user different from the user and acquired from the server is started, the game using an other-user character having been used in the game by the other user and the user character of the user. At a second timing after the start, advancement of the game is finished and advancement state data is transmitted to the server.

20 Claims, 25 Drawing Sheets

(51) Int. Cl.
    *A63F 13/56*        (2014.01)
    *A63F 13/58*        (2014.01)
    *A63F 13/822*      (2014.01)

(56) References Cited

U.S. PATENT DOCUMENTS

| | | | | |
|---|---|---|---|---|
| 10,960,305 | B2* | 3/2021 | Hisaoka | A63F 13/822 |
| 2012/0064968 | A1* | 3/2012 | Youm | A63F 13/795 |
| | | | | 463/29 |
| 2013/0184040 | A1* | 7/2013 | Nonaka | A63F 13/35 |
| | | | | 463/7 |
| 2014/0357356 | A1* | 12/2014 | Horie | A63F 13/2145 |
| | | | | 463/31 |
| 2017/0216728 | A1* | 8/2017 | Logan | A63F 13/213 |
| 2020/0070048 | A1* | 3/2020 | Ishii | A63F 13/92 |
| 2020/0391111 | A1* | 12/2020 | Yu | A63F 13/537 |
| 2021/0178273 | A1* | 6/2021 | Wu | G06N 7/01 |
| 2021/0268387 | A1 | 9/2021 | Yabuki et al. | |
| 2022/0314122 | A1* | 10/2022 | Ide | A63F 13/58 |

FOREIGN PATENT DOCUMENTS

| | | |
|---|---|---|
| JP | 2017-108817 | 6/2017 |
| JP | 2020-032118 | 3/2020 |
| JP | 2021-133138 | 9/2021 |

\* cited by examiner

F I G. 7

| TURN | 1 | 2 | 3 | 4 | 5 | 6 | 7 | 8 | 9 | 10 |
|---|---|---|---|---|---|---|---|---|---|---|
| OPERATION | USER 1 (OPERATE FIVE UNITS) | USER 2 (OPERATE SEVEN UNITS) | | USER 3 (OPERATE NINE UNITS) | | | USER 4 (OPERATE TEN UNITS) | | USER 5 (OPERATE TEN UNITS) | |
| UNIT 1 | UNIT OF USER 1 | | | | | | | | UNIT OF USER 5 | |
| UNIT 2 | UNIT OF USER 1 | | | | | | | | | |
| UNIT 3 | UNIT OF USER 1 | | | | | | | | | |
| UNIT 4 | UNIT OF USER 1 | | | | | UNIT OF USER 4 | | | | |
| UNIT 5 | UNIT OF USER 1 | | | | | | | | | |
| UNIT 6 | | UNIT OF USER 2 | | | | | | | | |
| UNIT 7 | | UNIT OF USER 2 | | | | | | | | |
| UNIT 8 | | | | UNIT OF USER 3 | | | | | | |
| UNIT 9 | | | | UNIT OF USER 3 | | | | | | |
| UNIT 10 | | | | | | | UNIT OF USER 4 | | | |

BEATEN HERE

ANY UNIT CAN BE REPLACED IN CASE OF EXCEEDING TEN UNITS

FIG. 8
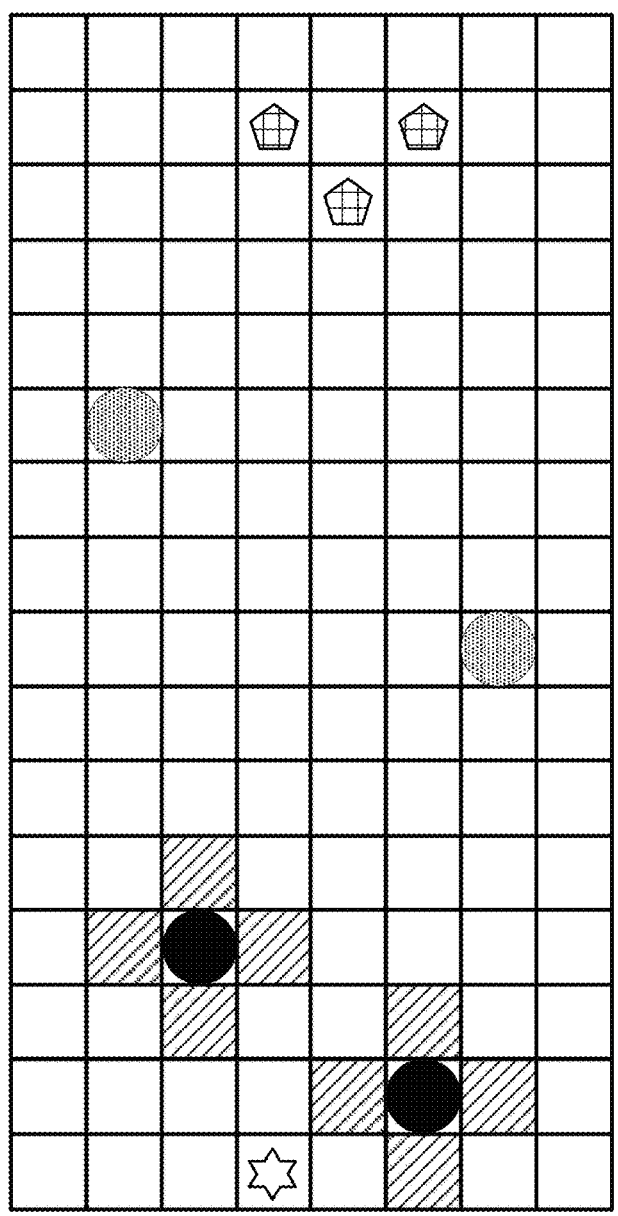
 INACTIVE REINFORCEMENT POINT
 OWN MILITARY UNIT
 ACTIVE REINFORCEMENT POINT (REINFORCEMENT ALLOWED CELL)
 ENEMY MILITARY UNIT
 REINFORCEMENT ALLOWED CELL FIG. 10
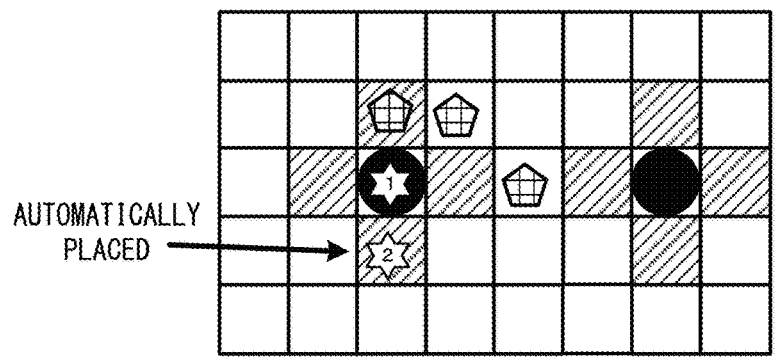
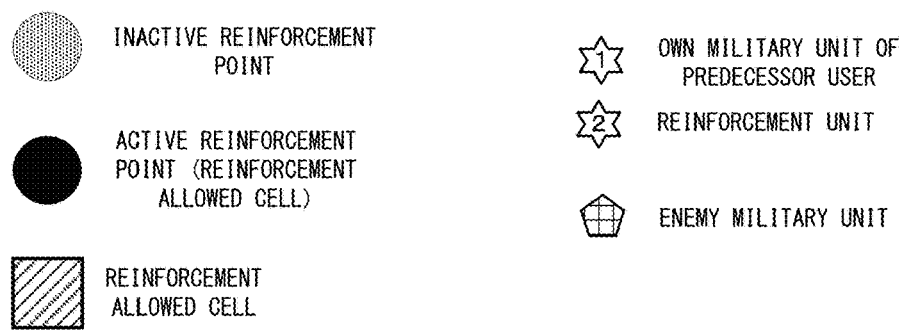
FIG. 11
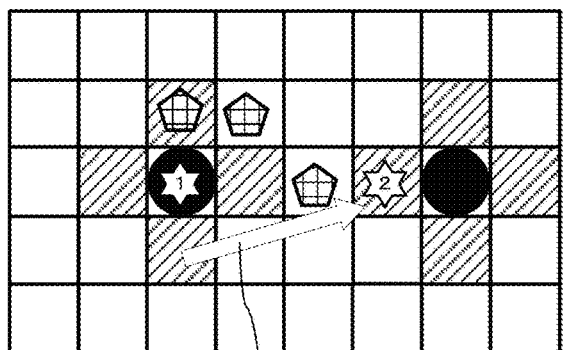
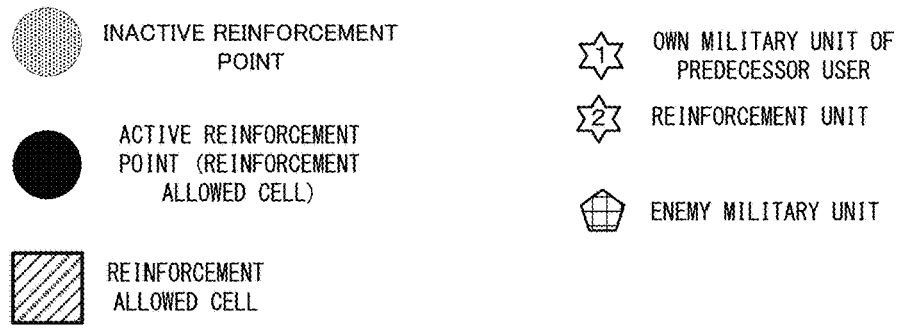

FIG. 12
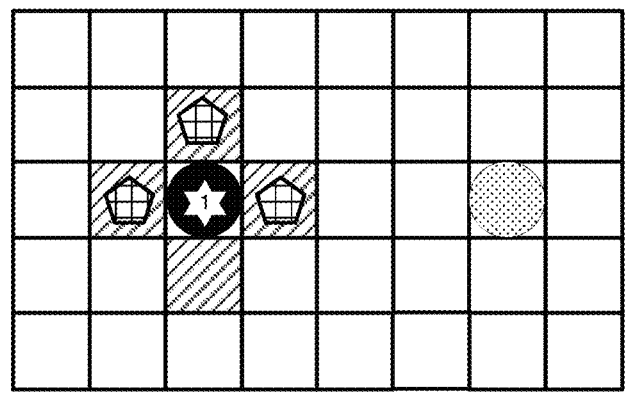
 INACTIVE REINFORCEMENT POINT
 ACTIVE REINFORCEMENT POINT (REINFORCEMENT ALLOWED CELL)
 REINFORCEMENT ALLOWED CELL
 OWN MILITARY UNIT OF PREDECESSOR USER
 ENEMY MILITARY UNIT

| BATTLE ID | LAST UPDATE DATE AND TIME | MAP ID | LOCK FLAG | FINISH FLAG | BATTLE LOG DATA |
|---|---|---|---|---|---|
| 0001 | yyyy/mm/dd hh:mm:ss | 01 | OFF | ON | ... |
| 0002 | yyyy/mm/dd hh:mm:ss | 02 | OFF | OFF | ... |
| 0003 | yyyy/mm/dd hh:mm:ss | 04 | OFF | OFF | ... |
| 0004 | yyyy/mm/dd hh:mm:ss | 02 | ON | OFF | ... |

| USER ID | RESULT DATA | REGISTRATION DATE AND TIME |
|---|---|---|
| 0011 | ... | yyyy/mm/dd hh:mm:ss |
| 0362 | ... | yyyy/mm/dd hh:mm:ss |
| 0539 | ... | yyyy/mm/dd hh:mm:ss |
| 0297 | ... | yyyy/mm/dd hh:mm:ss |
| 0065 | ... | yyyy/mm/dd hh:mm:ss |

521 522 523

607

| HISTORY NUMBER | DATE AND TIME DATA | BATTLE ID | REWARD FLAG |
|---|---|---|---|
| 0001 | yy/mm/dd hh:mm:ss | 12345 | ON |
| 0002 | yy/mm/dd hh:mm:ss | 67890 | OFF |

F I G. 2 3
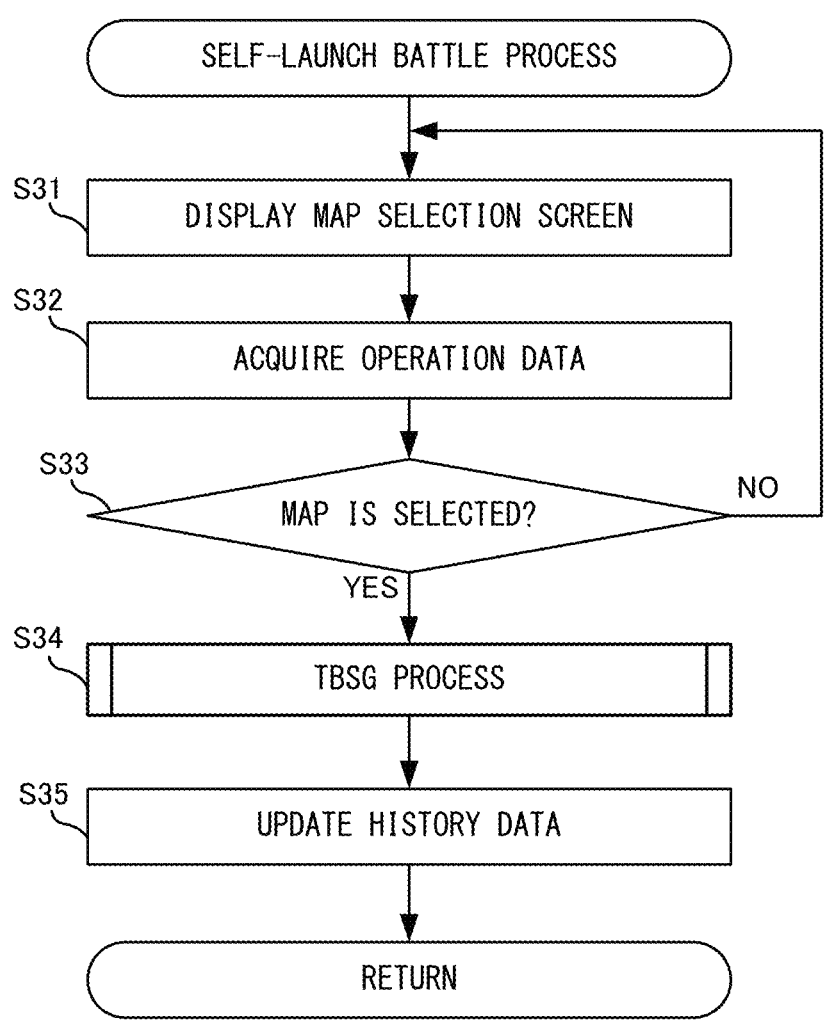

COMPUTER-READABLE NON-TRANSITORY STORAGE MEDIUM HAVING GAME PROGRAM STORED THEREIN, GAME SYSTEM, GAME APPARATUS, AND GAME PROCESSING METHOD

CROSS REFERENCE TO RELATED APPLICATION

This application claims priority to Japanese Patent Application No. 2022-151137 filed on Sep. 22, 2022, the entire contents of which are incorporated herein by reference.

FIELD

The present disclosure relates to game processing for executing a game on an information processing terminal of a user.

BACKGROUND AND SUMMARY

Conventionally, there has been known a game system that includes a multiplay mode in which game states are synchronized through communication among a plurality of game apparatuses and a user advances the game together with other users.

The above game system can be considered to be suitable for a case of performing communication competition play in a racing game or the like, for example. However, depending on the nature or the genre of the game, it might be difficult to advance the same game among a plurality of players while synchronizing the advancement states of the game through communication with each other's game apparatus in real time.

Accordingly, an object of the present disclosure is to provide a computer-readable non-transitory storage medium having a game program stored therein, a game system, a game apparatus, and a game processing method that make it possible to enjoy multiplay even in a game having such a nature that it is difficult to advance the same game while synchronizing the advancement states of the game in real time.

Configuration examples for achieving the above object will be shown below.

(Configuration 1)

Configuration 1 is a computer-readable non-transitory storage medium having stored therein a game program for executing a game on an information processing terminal of a user, the program causing a computer of the information processing terminal to: on the basis of a first start instruction input from the user, start the game that is based on predetermined initial setting data and uses a user character of the user; advance the game started by the first start instruction input, on the basis of an operation input from the user; at a first timing after the game is started by the first start instruction input, finish advancement of the game, and transmit advancement state data indicating an advancement state of the game at the first timing, to a server; on the basis of a second start instruction input from the user, start the game that is based on the advancement state data transmitted to the server by another information processing terminal operated by another user different from the user and acquired from the server by the information processing terminal of the user, the game using an other-user character having been used in the game by the other user and the user character of the user; on the basis of an operation input from the user, advance the game started on the basis of the second start instruction input; at a second timing after the game is started on the basis of the second start instruction input, finish advancement of the game, and transmit advancement state data indicating an advancement state of the game at the second timing, to the server; and in a case where a victory condition of the game is satisfied by a time when the second timing has come, transmit advancement state data indicating an advancement state of the game until the victory condition is satisfied, to the server.

According to the above configuration example, it is possible to advance the same game cooperatively without performing real-time communication among a plurality of information processing terminals. In addition, in the game started on the basis of the second start instruction input, a character of another user can also be used in addition to the own possessed character. Thus, it becomes possible to reverse game development that is disadvantageous due to shortage of the battle force, for example, whereby the tactical characteristic can be improved and amusement of the game can also be improved.

(Configuration 2)

In configuration 2 based on the above configuration 1, the game may be a turn-based strategy game. The first timing may be a timing when a first turn number of turns have elapsed since start of the game by the first start instruction input, and the second timing may be a timing when a second turn number of turns have elapsed since start of the game by the second start instruction input.

According to the above configuration example, it is possible to let users enjoy cooperative play in the turn-based strategy game. In particular, in the turn-based strategy game, play time for one map tends to be long, but since cooperative play can be performed in an asynchronous manner, each user can participate in the game at an individual pace, to enjoy the cooperative play.

(Configuration 3)

In configuration 3 based on the above configuration 2, when the game is in a phase of the user, the game may be advanced on the basis of an operation by the user, and when the game is in a phase of an opponent, the game may be advanced on the basis of an operation by the computer based on AI control. One turn in a count of each of the first turn number and the second turn number may be determined to have elapsed when one turn in the phase of the user and one turn in the phase of the opponent have finished.

According to the above configuration example, it is possible to provide such cooperative play that the turn-based strategy game is advanced with the user-side phase undertaken in a shared manner by a plurality of users against the opponent's phase subjected to AI control. Thus, it is possible to provide such a way of enjoying that a plurality of users join forces to confront the opponent (subjected to AI control).

(Configuration 4)

In configuration 4 based on any one of the above configurations 1 to 3, the game started by the first start instruction input may be advanced through control of the user character in a virtual space being performed on the basis of the operation input from the user, and the game started by the second start instruction input may be advanced through control of the user character and the other-user character in the virtual space being performed on the basis of the operation input from the user.

According to the above configuration example, since the user can operate characters of other users in addition to own possessed characters, it is possible to provide such a way of battle that uses also characters of other users, whereby the strategic characteristic and the tactical characteristic of the game can be improved.

(Configuration 5)

In configuration 5 based on the above configuration 4, in a case of starting the game by the second start instruction input, the game may be started with the user character of the user placed at a predetermined position in the virtual space determined on the basis of the acquired advancement state data.

According to the above configuration example, the appearance position of the user character at the start of the game by the second start instruction input can be made different in accordance with the advancement state of the game. Thus, it becomes possible to immediately put the user character at the battlefront.

(Configuration 6)

In configuration 6 based on the above configuration 5, in a case of starting the game by the second start instruction input, the user character may be placed at a reinforcement allowed position set in advance as a position where the user character is allowed to be placed, and a number of the reinforcement allowed positions may be changeable in accordance with an advancement state of the game.

According to the above configuration example, it is possible to provide such game development that, while positions where the user character can be placed is limited to a certain extent, the number of the positions is gradually increased in accordance with the advancement state of the game. Thus, it is possible to make an appropriate balance while preventing such a situation that characters can be placed everywhere and thus the game balance is lost. In addition, even in a case of participating in the game part-way through, it is possible to immediately put the user character at the battlefront.

(Configuration 7)

In configuration 7 based on the above configuration 1, in the game started by the first start instruction input and/or the game started by the second start instruction input, a plurality of options prepared in advance may be presented to the user when advance of the game is finished. In transmitting the advancement state data, in a case where any of the plurality of options is designated by the user, option data regarding the designated option may be transmitted to the server in association with the advancement state data. In a case of starting the game by the second start instruction input, if there is the option data associated with the advancement state data acquired from the server, an image based on the option data may be outputted.

According to the above configuration example, it is possible to communicate some intention in a form such as a cheering message selected from options, to another user who plays after the own play. In addition, it is possible to confirm the intention from the predecessor at the time of the user's own play. Thus, it is possible to perform simple communication between users, whereby amusement of the game can be improved.

(Configuration 8)

In configuration 8 based on any one of the above configuration 1 to 7, in a case of starting the game by the second start instruction input, replay indicating progress of the game until the first timing or the second timing may be outputted before start of the game, on the basis of the advancement state data acquired from the server.

According to the above configuration example, it is possible to let the user grasp game development made until play at this time. In addition, since the user can watch other users' play contents, the user can use them as a reference for the user's own play.

(Configuration 9)

In configuration 9 based on the above configuration 8, in a case of starting the game by the second start instruction input, the game may be started if the second start instruction input is performed by the user, after the replay is outputted.

According to the above configuration example, it is possible to grasp game development in detail through replay before start of the game. In addition, while having grasped game development made thus far through replay, the user can select whether or not to play successively from the present part of the game.

(Configuration 10)

In configuration 10 based on any one of the above configurations 1 to 9, in the game started by the first start instruction input or the game started by the second start instruction input, after advancement of the game is finished, if an advancement state confirmation instruction input is performed by the user, the advancement state data may be acquired from the server in accordance with the advancement state confirmation instruction input, and replay indicating progress of the game may be outputted on the basis of the advancement state data.

According to the above configuration example, it is possible to confirm what result the game in which the user has participated has reached thereafter. In addition, since the user can watch other users' play contents, the user can use them as a reference for the user's own play.

(Configuration 11)

In configuration 11 based on any one of the above configurations 1 to 10, the game program may further cause the computer to: if the victory condition of the game is satisfied by the time when the second timing has come, give the user a first reward based on the satisfaction of the victory condition of the game; and after the information processing terminal of the user transmits the advancement state data based on the game to the server, if the advancement state of the game by the other user satisfies the victory condition of the game, give the user a second reward whose value is lower than that of the first reward.

According to the above configuration example, the user can be given a better reward when the user has satisfied the victory condition in the user's own play. Thus, it is possible to enhance a user's motivation to achieve the victory condition.

(Configuration 12)

In configuration 12 based on the above configuration 11, if the defeat condition is satisfied by the time when the second timing has come, the advancement state data until the defeat condition is satisfied is transmitted to the server. The game program may further cause the computer to, if the defeat condition of the game is satisfied by the time when the second timing has come, give the user a third reward which is based on the satisfaction of the defeat condition of the game and whose value is lower than that of the first reward.

According to the above configuration example, even in a case of being defeated in the game, each user can be given a reward as long as the user has participated in the game. Thus, it is possible to provide the user with a motivation to participate in the game.

(Configuration 13)

In configuration 13 based on any one of the above configurations 1 to 12, the game program may further cause the computer to execute a game application including the game that is started by the first start instruction input or the second start instruction input, and a growth game that is different from the game and allows the user character to be grown. In a case of starting the game by the first start instruction input and in a case of starting the game by the second start instruction input, the game using the user character grown in the growth game may be started.

According to the above configuration example, it is possible to let another user use the character grown in the growth game by the user. In addition, conversely, it is possible to use the character grown by another user, in the user's own play. Thus, it is possible to provide such a way of enjoying by mutually showing a character grown by each user among users. In addition, since the user can advance the game using the character grown by another user, the user can confirm the performance and the like of the character in its grown-up state, and this can enhance a motivation to grow the user's own possessed character.

(Configuration 14)

In configuration 14 based on the above configuration 13, in a case of starting the game by the second start instruction input, if a number of the other-user characters having been used in the game by the other user has reached a predetermined number, the game may be started without causing the user character of the user to appear in the game or the game may be started with the other-user character replaced with the user character.

According to the above configuration example, since the number of characters that can be used (appear) is limited to a predetermined number or lower, it is possible to prevent such a situation that the game balance is lost when characters can be used without limitation of the number thereof, and thus the game balance can be kept appropriate.

(Configuration 15)

In configuration 15 based on the above configuration 1, in a case of starting the game by the first start instruction input, the game using a user character selected by the user from a plurality of user characters may be started. In a case of starting the game by the second start instruction input, the game using the other-user character having been used in the game by the other user and a user character different from the other-user character among the plurality of user characters, may be started.

According to the above configuration example, it is possible to prevent identical (overlapping) characters from being used in the same game. Thus, it is possible to prevent such game development that only (identical) characters having strong performance appear, whereby occasions of using various characters different in performance and feature can be increased.

(Configuration 16)

In configuration 16, in transmitting the advancement state data at the first timing, the advancement state data may be transmitted to the server in a state in which a range of the other users allowed to acquire the advancement state data is designated on the basis of an operation input from the user.

According to the above configuration example, for example, in a case where the user has designated another user who is used to the game to a certain extent as a friend, the possibility that the game will be cleared after the user has played can be increased.

According to the present disclosure, it is possible to advance the same game through cooperation among a plurality of users, without synchronizing the advancement states of the game through communication among a plurality of information processing terminals in real time.

BRIEF DESCRIPTION OF THE DRAWINGS

FIG. 7 is a non-limiting example of the relationship between elapse of turns and the number of operable units;

FIG. 8 is a non-limiting example of reinforcement points and reinforcement allowed cells;

FIG. 10 is a non-limiting example of reinforcement points and reinforcement allowed cells;

FIG. 11 is a non-limiting example of reinforcement points and reinforcement allowed cells;

FIG. 12 is a non-limiting example of reinforcement points and reinforcement allowed cells;

FIG. 16 is a non-limiting example of the data structure of battle log data 516;

FIG. 23 is a non-limiting example of a flowchart showing the details of a self-launch battle process;

DETAILED DESCRIPTION OF NON-LIMITING EXAMPLE EMBODIMENTS

Figure 1:
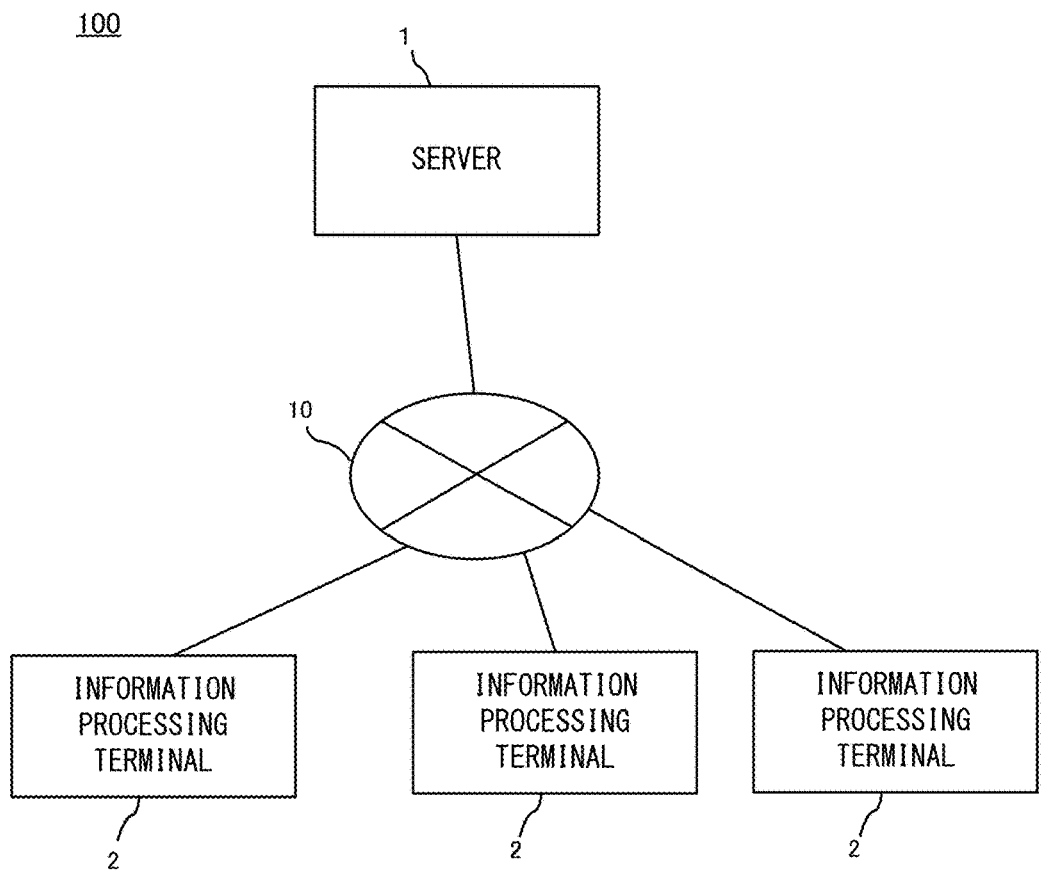
FIG. 1 is a schematic diagram showing a non-limiting example of the entire configuration of an information processing system according to the exemplary embodiment.

Hereinafter, one exemplary embodiment of the present disclosure will be described. FIG. 1 is a schematic diagram showing the entire configuration of an information processing system (game system) according to the exemplary embodiment. An information processing system 100 of the exemplary embodiment includes a server 1 and a plurality of information processing terminals 2. The server 1 and each information processing terminal 2 are configured to be able to communicate with each other via a network 10 such as the Internet. In the exemplary embodiment, with such a configuration, information processing is executed. Hereinafter, a description will be given with game processing as an example of the information processing. Specifically, it is assumed as an example that a game program is installed on the information processing terminal 2 and the game processing is executed while the information processing terminal 2 is communicating with the server 1 as necessary.

[Hardware Configuration of Server]

Figure 2:
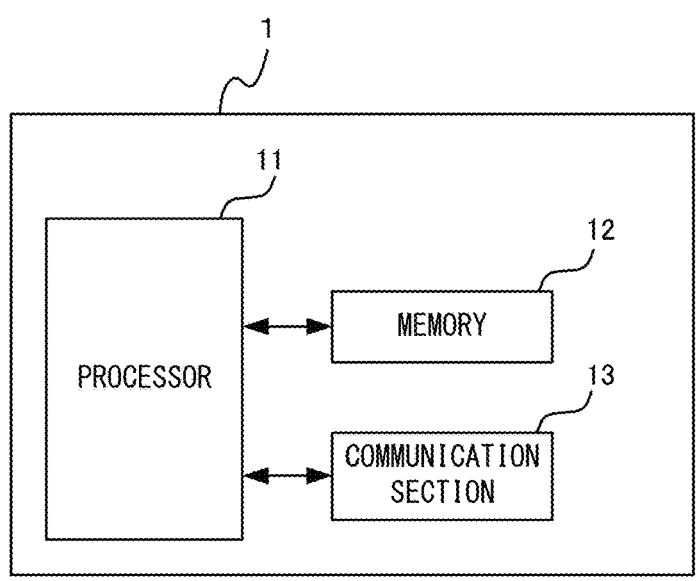
FIG. 2 is a block diagram showing a non-limiting example of the hardware configuration of a server 1.

Next, the hardware configuration of the server 1 will be described. FIG. 2 is a block diagram illustrating the hardware configuration of the server 1. The server 1 includes at least a processor 11, a memory 12, and a communication section 13. The processor 11 executes various programs for controlling the server 1. In the memory 12, various programs to be executed by the processor 11 and various kinds of data to be used by the processor 11 are stored. The communication section 13 connects to a network by means of wired or wireless communication and transmits/receives predetermined data to/from each information processing terminal 2 or another server (not shown).

[Hardware Configuration of Information Processing Terminal]

Next, the information processing terminal 2 will be described. The information processing terminal 2 is, for example, a smartphone, a stationary or hand-held game apparatus, a tablet terminal, a mobile phone, a personal computer, a wearable terminal, or the like. In addition, the information processing according to the exemplary embodiment can also be applied to a game system that includes the above game apparatus or the like and a predetermined server. In the exemplary embodiment, a stationary game apparatus (hereinafter, referred to simply as a game apparatus) will be described as an example of the information processing terminal 2.

Figure 3:
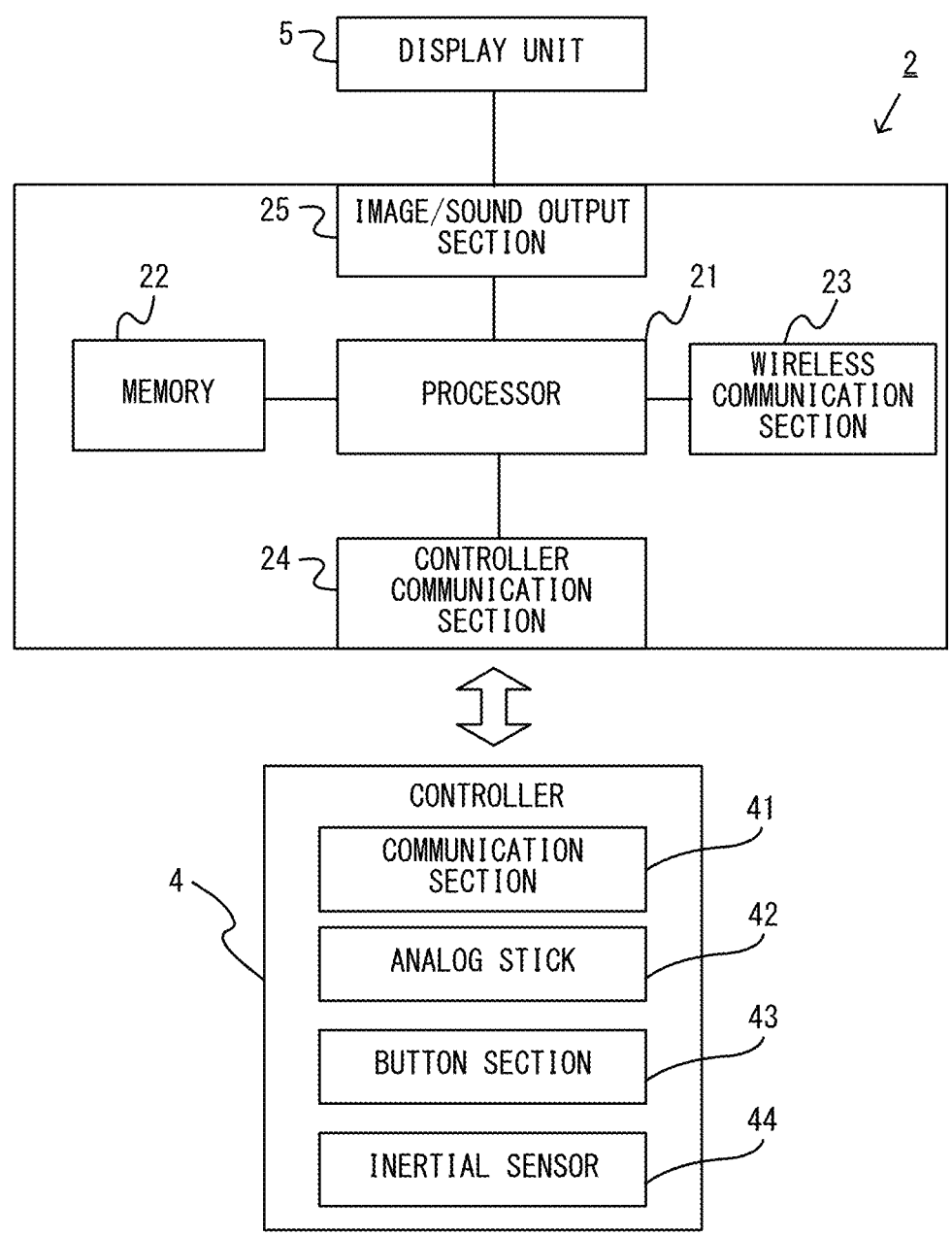
FIG. 3 is a block diagram showing a non-limiting example of the hardware configuration of a game apparatus 2.

FIG. 3 is a block diagram showing an example of the hardware configuration of a game apparatus 2 according to the exemplary embodiment. In FIG. 3, the game apparatus 2 includes a processor 21. The processor 21 is an information processing section for executing various types of information processing to be executed by the game apparatus 2. For example, the processor 21 may be composed only of a CPU (Central Processing Unit), or may be composed of a SoC (System-on-a-chip) having a plurality of functions such as a CPU function and a GPU (Graphics Processing Unit) function. The processor 21 performs the various types of information processing by executing an information processing program (e.g., a game program) stored in a storage section 22. The storage section 22 may be, for example, an internal storage medium such as a flash memory and a dynamic random access memory (DRAM), or may be configured to utilize an external storage medium mounted to a slot that is not shown, or the like.

The game apparatus 2 also includes a wireless communication section 23 for the game apparatus 2 to perform wireless communication with another game apparatus 2 or a predetermined server device. As this wireless communication, for example, internet communication or short-range wireless communication is used.

The game apparatus 2 also includes a controller communication section 24 for the game apparatus 2 to perform wired or wireless communication with a controller 4.

Moreover, a display unit 5 (for example, a television or the like) is connected to the game apparatus 2 via an image/sound output section 25. The processor 21 outputs an image and sound generated (for example, by executing the above information processing) to the display unit 5 via the image/sound output section 25.

Next, the controller 4 will be described. Although not shown, the controller 4 of the exemplary embodiment has a housing having a vertically long shape, and can be held in the orientation in which the housing is vertically long. The housing has a shape and a size that allow the housing to be held with one hand when the housing is held in the orientation in which the housing is vertically long.

The controller 4 includes at least one analog stick 42 which is an example of a direction input device. The analog stick 42 can be used as a direction input section with which a direction can be inputted. By tilting the analog stick 42, a user is allowed to input a direction corresponding to the tilt direction (also input a magnitude corresponding to the tilt angle). In addition, the controller 4 includes a button section 43 including various operation buttons. For example, the controller 4 may include a plurality of operation buttons on a main surface of the housing.

Moreover, the controller 4 includes an inertial sensor 44. Specifically, the controller 4 includes an acceleration sensor and an angular velocity sensor as the inertial sensor 44. In the exemplary embodiment, the acceleration sensor detects the magnitudes of accelerations along predetermined three axial directions. In addition, the angular velocity sensor detects angular velocities about predetermined three axes.

The controller 4 also includes a communication section 41 for performing wired or wireless communication with the controller communication section 24. The content of a direction input to the analog stick 42, information indicating the press state of the button section 43, and various detection results by the inertial sensor 44 are repeatedly outputted to the communication section 41 and transmitted to the game apparatus 2 at appropriate timings.

[Game Assumed in the Exemplary Embodiment]

Next, game processing executed in the exemplary embodiment will be described. As a premise thereof, the outline of a game assumed in the exemplary embodiment will be described first. The game assumed in the exemplary embodiment is a simulation game of a turn-based strategy type (hereinafter, referred to as TBSG). In the TBSG assumed in the exemplary embodiment, combat is done between a total of two military teams, i.e., one own military team and one enemy military team. In this TBSG, a piece used in the simulation game is referred to as "unit". A unit in the own military team is referred to as "own military unit", and a unit in the "enemy military team" is referred to as "enemy military unit".

Figure 4:
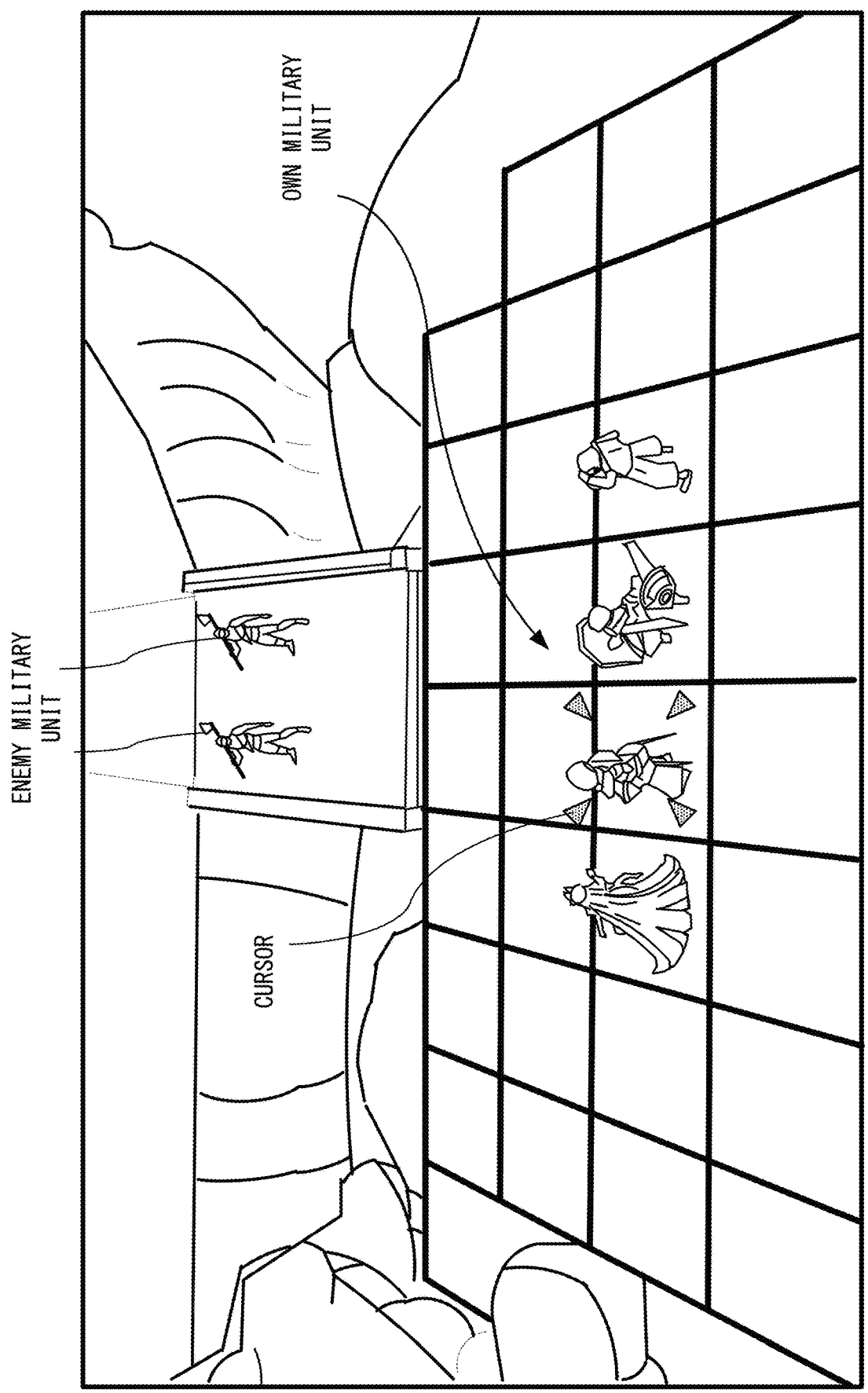
FIG. 4 is a non-limiting example of a game screen.

FIG. 4 shows an example of a combat screen in this game. As shown in FIG. 4, in this game, a game image obtained by taking a virtual three-dimensional space with a virtual camera is displayed. The ground in the virtual three-dimensional space is divided into rectangular cells, and the user can move each unit on a cell basis. The virtual space as the game space may be a two-dimensional space. In this game, each of own military units and enemy military units is a human-type character. In this game, each unit is equipped with a predetermined weapon. The units do combat with each other using the weapons in the TBSG. In this game, characters that are the own military units do not include overlapping characters (identical characters). That is, the characters are "different characters". Determination as to overlapping characters may be performed on the basis of whether or not the character's names are identical or whether or not internal data such as IDs allocated to the characters are identical, for example.

[First Game Mode]

In this game, there are a first game mode in which the user can advance the game alone, and a second game mode in which a plurality of users can play on one map. In the first game mode, the user can advance the game along a predetermined story. While advancing the story, the user can increase the number of own military units possessed by the user. This game has a feature of growing an own military unit, and each unit can be grown in the first game mode. Specifically, each unit has a "unit level", and it is possible to raise the unit level by earning experience points through repetitive dispatch of the same unit, or the like, in the first game mode. As the unit level is raised, the performance of the unit is also increased and improved.

[Second Game Mode]

On the other hand, in the second game mode, on a predetermined map prepared in advance, a plurality of users advance the game while taking over the play in a relay manner as the same "own military team" by several turns for each user. This provides users an unprecedented novel multiplay in the TBSG. For example, in the TBSG, in a case of performing multiplay via a network using a predetermined map, it is conceivable that, as in a case of performing communication competition in a racing game or a fighting game, a plurality of game apparatuses are connected via the network to perform communication play while establishing synchronization in real time. However, in the case of TBSG, it is generally considered that the play time for one map is comparatively long. In addition, in the TBSG, an own military phase and an enemy military phase are alternately performed, and therefore, a waiting time arises for the user in the enemy military phase. Considering the length of the play time for one map, presence of a waiting time in the enemy military phase, and the like, communication play in real time is considered unsuitable for the TBSG unless designing is specially made. Accordingly, the exemplary embodiment provides (asynchronous) cooperative play in which, on one map, a plurality of users undertake operations separately by a predetermined number of turns for each user in a phase of the own military team, while aiming at clearing the map (it is noted that an enemy military phase is subjected to AI control). That is, it suffices that each user has to connect to the network only when the user undertakes operation. Hereinafter, the TBSG in the second game mode is referred to as "relay battle".

In the relay battle, each unit cannot gain experience points and cannot be grown. In other words, the second game mode serves also as a game mode for providing an occasion in which the own military unit grown in the first game mode is allowed to show its performance. Hereinafter, the outline of the relay battle will be described.

In the following description, "one turn" refers to one set of one turn in an own military phase and one turn in an enemy military phase. For example, the wording "one turn has elapsed" means that one turn in an own military phase and one turn in an enemy military phase have elapsed.

[Overall Flow of Relay Battle]

Figure 5:
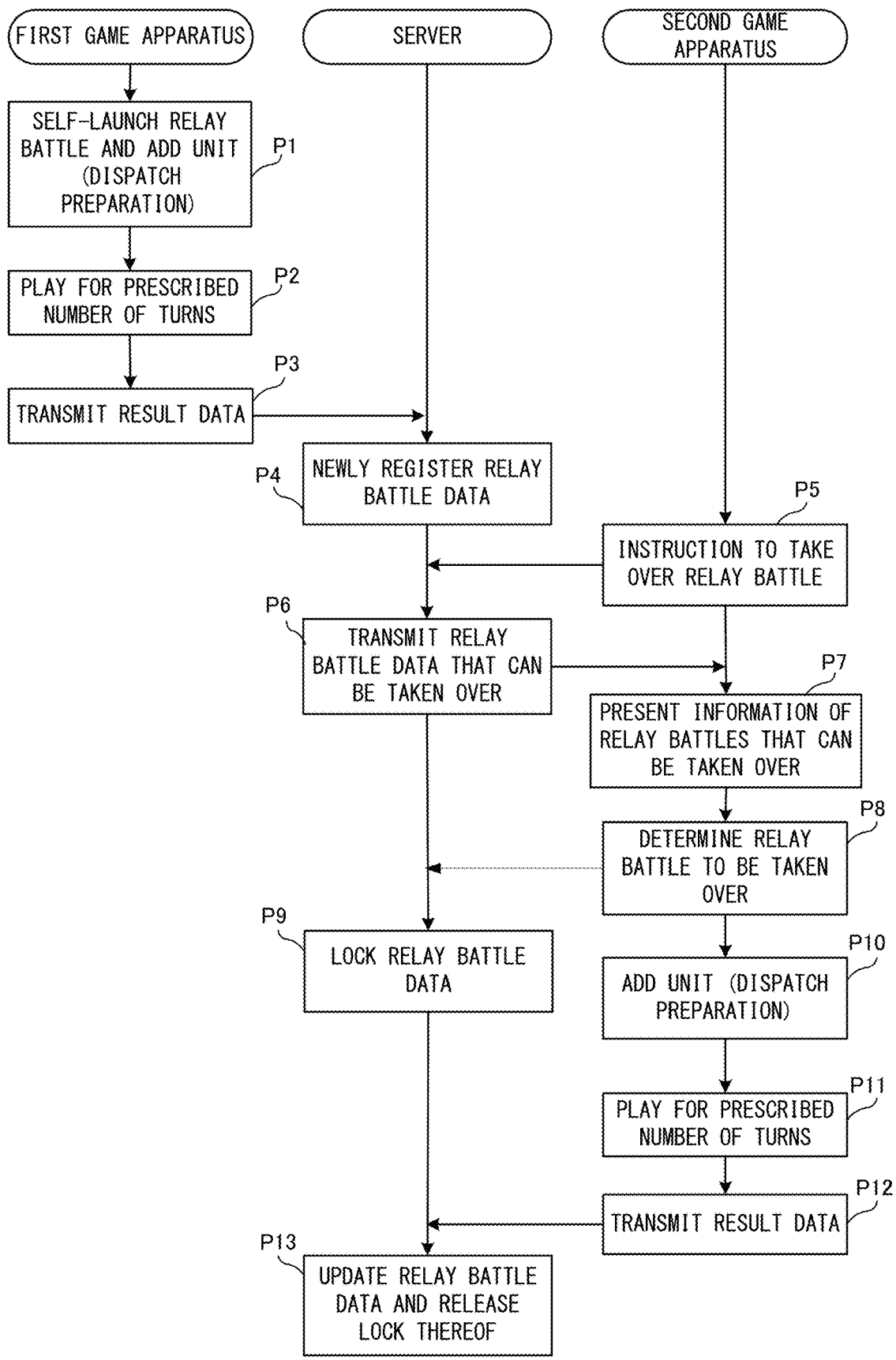
FIG. 5 shows a non-limiting example of overall flow of communication and processing in a relay battle in the exemplary embodiment.

FIG. 5 shows overall flow of communication and processing in the relay battle in the exemplary embodiment. Here, as an example, it is assumed that there are a first game apparatus operated by a first user and a second game apparatus operated by a second user. In this flow, it is assumed that the relay battle started by the first user is taken over and played by the second user. In the following description, starting the relay battle by the first user is referred to as "self-launching". In addition, the user who has self-launched is referred to as "self-launch user". In the exemplary embodiment, it is assumed that each user can take over (participate in) the same relay battle only once. In addition, it is assumed that the self-launch user cannot take over the relay battle by him/herself. In the following description, users who have taken over the relay battle self-launched by another user are collectively referred to as "taking-over users".

Figure 6:
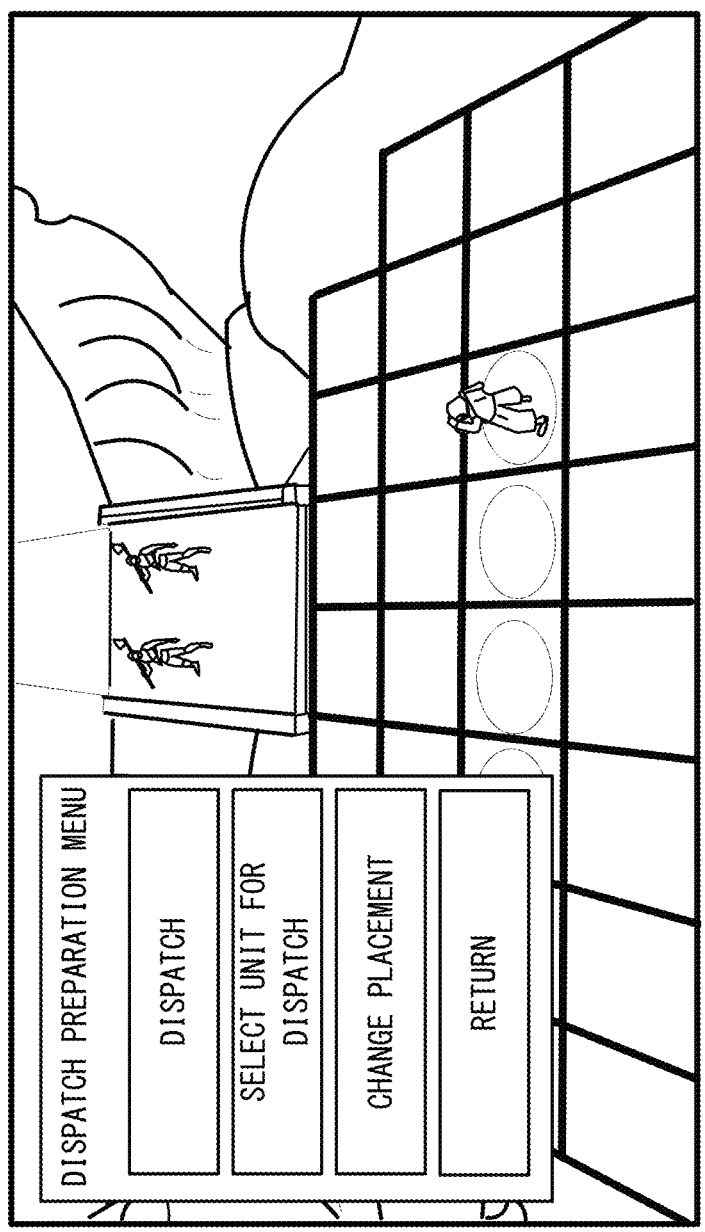
FIG. 6 is a non-limiting example of a dispatch preparation screen.

In FIG. 5, first, in a process P1, the first user self-launches a relay battle by the first game apparatus. For example, the first user selects a predetermined map from a plurality of maps prepared in advance for relay battles. Then, the first user performs instruction to start the relay battle using the map. Thereafter, a "dispatch preparation screen" for the relay battle is displayed. FIG. 6 shows an example of the dispatch preparation screen. On the dispatch preparation screen, the map (the display range thereof can be changed) to be used in this relay battle, and a dispatch preparation menu, are displayed. The first user performs predetermined operations on the screen, to select the unit to be dispatched for the relay battle from the units possessed by the first user, and place the unit on the map for the relay battle. Positions where the unit can be placed will be separately described later. In the exemplary embodiment, the upper limit number of units that can be dispatched by the first user (self-launch user) is up to five, and the upper limit number of units that can be dispatched by each of second and subsequent users (taking-over users) is up to two. In another exemplary embodiment, the upper limit dispatch number for each user may be another value.

Returning to FIG. 5, next, in a process P2, the first user plays the relay battle for a prescribed number of turns. In the exemplary embodiment, the prescribed number of turns is two. The prescribed number of turns is merely an example, and in another exemplary embodiment, another value may be employed.

Next, in a process P3, result data regarding the first user's play is transmitted from the first game apparatus to the server. The result data includes log data indicating actions of an own military unit and an enemy military unit in each turn and a combat result, etc. In other words, the result data is data indicating the advancement state of the game according to each user's play.

Next, in a process P4, in the server, relay battle data for the relay battle self-launched by the first user is newly registered on the basis of the result data received from the first game apparatus.

Next, in a process P5, in the second game apparatus, the second user performs an instruction operation to "take over" a relay battle. That is, the second user performs an operation to indicate that the second user will take over and play a relay battle self-launched by another user as seen from the second user. Accordingly, a request for data of relay battles that can be taken over is transmitted from the second game apparatus to the server.

Next, in a process P6, in the server, in accordance with the request from the second game apparatus, a predetermined number of data of relay battles that can be taken over at present are selected, and the data are transmitted to the second game apparatus. Here, it is assumed that data of the relay battle self-launched by the first user is also included in the predetermined number of selected data of relay battles.

Next, in a process P7, in the second game apparatus, a list of the relay battles that can be taken over is presented on the basis of the data received from the server. The second user can select a predetermined relay battle from the list and refer to information about the relay battle. In the exemplary embodiment, as one kind of the information, in the second game apparatus, the play content and game progress (advancement state) until the present are reproduced as "replay" on the basis of the data of the relay battle (the above result data). For example, in a case where the relay battle of the first user is selected, the actual TBSG screen is displayed, and the action of each unit used by the first user and the combat content thereof are reproduced in the order from the first turn. Thus, the second user can know how the first user has advanced the game. It is noted that, unlike a case of taking over data from a self-launch user such as the first user, in a case where there are a plurality of users (hereinafter, collectively referred to as predecessors) who have played before the second user, as in such a relay battle that there has already been a taking-over user who has played the relay battle by taking over data from the self-launch user or a next taking-over user who has played the relay battle by taking over data from the previous taking-over user, the play contents of all the predecessors are replayed sequentially.

Next, in a process P8, in the second game apparatus, an operation of determining the relay battle to be taken over from the list is performed. Here, as an example, among the relay battles that can be taken over and which are presented to the second user, the relay battle self-launched by the first user is determined to be taken over. In accordance with this operation, a taking-over determination notification is transmitted to the server 1.

Next, in a process P9, the server 1 performs processing of temporarily locking the data for the relay battle self-launched by the first user, so that this relay battle will not be treated as a relay battle "that can be taken over" while the second user is playing.

Next, in a process P10, in the second game apparatus, a dispatch preparation screen is displayed, and the second user selects and places a unit (up to two units) to be dispatched for the relay battle, from the units possessed by the second user.

Next, in a process P11, in the second game apparatus, the second user plays for a prescribed number of turns (in this example, two turns). At this time, the second user can operate not only the own military unit dispatched by the second user, but also the own military unit (hereinafter, predecessor unit) dispatched by the first user. For example, in a case where the first user has dispatched five units and the second user has dispatched two units, the second user can operate a total of seven own military units.

Next, in a process P12, result data regarding the play of the second user is transmitted from the second game apparatus to the server.

Next, in a process P13, the server 1 receives the result data from the second game apparatus. Then, the server 1 updates data of the relay battle self-launched by the first user on the basis of the result data. In addition, the lock of the data of the relay battle is released. Thus, the updated data of the relay battle comes to be treated as a relay battle that can be taken over.

Subsequently, if another user such as a third user or a fourth user participates as a taking-over user, the above processes P5 to P13 are repeated for each user. Then, when a predetermined victory condition (e.g., beat a boss character) or a defeat condition (e.g., the own military team is annihilated) set on the relay battle is satisfied, the relay battle is finished. Then, when the relay battle is finished, predetermined rewards are given to the participants in the relay battle (through an operation for progress confirmation described later).

As described above, the relay battle in the exemplary embodiment is performed while operation of the own military team in the TBSG is taken over by a plurality of users per a prescribed number of turns. As described above, in the relay battle, each user can operate also predecessor units. Therefore, it can become possible for the user to play using more own military units as the user takes over the relay battle at a later timing (more turns have elapsed since the start of the relay battle). FIG. 7 shows an example of the relationship between elapse of turns and the number of units that can be operated. In FIG. 7, it is assumed that five users, i.e., user 1 to user 5, participate in the relay battle. In this example, each user performs operations for two turns. In this map, a dispatch upper limit number is set for own military units, and this number is assumed to be 10. In FIG. 7, the user 1 who is a self-launch person dispatches five units. Therefore, the units that can be operated by the user 1 are the five units. Next, the user 2 who has subsequently taken over dispatches two units. Therefore, the user 2 can operate a total of seven units, including the units of the user 1. In addition, the user 3 who has subsequently taken over also dispatches two units, and therefore the user 3 can operate a total of nine units, including the predecessor units.

Next, in a case where the user 4 takes over the relay battle subsequently, since nine units have already been dispatched (present on the map), the user 4 basically can dispatch only one unit. However, in a case where the dispatch upper limit number has been reached, it is also possible to further dispatch a unit possessed by the user 4 by "replacing" an existing unit. In FIG. 7, as an example of replacement, the unit 4 which is the unit dispatched by the user 1 is replaced with a unit of the user 4. In this case, the user 4 has dispatched a total of two units of the user 4. As a result, the user 4 can operate a total of ten units, including the predecessor units.

Here, it is assumed that the unit 1 is beaten by the enemy in the play by the user 4 (the unit 1 is beaten in the seventh turn). In this case, the unit 1 disappears on the map, so that the number of the own military units is nine in the eighth turn. Thereafter, when the user 5 has taken over from the user 4, the user 5 basically can dispatch only one unit. However, as described above, in a case where the dispatch upper limit number has been reached, it is possible to further dispatch a unit possessed by the user 5 by "replacing" an existing unit. In the example in FIG. 7, a unit possessed by the user 5 is dispatched as the unit 1 which has been just beaten, and a unit of the user 5 is dispatched as the unit 6 by replacing the unit of the user 2. As a result, the user 5 also can operate a total of ten units, including the predecessor units.

As described above, when each user takes over the relay battle, each taking-over user can dispatch units (up to two units) possessed by the user within a range not exceeding the dispatch upper limit number set for each map. Therefore, the user can choose from two ways of enjoying, i.e., a way of enjoying by participating (taking over) at an early stage after the self-launch of the relay battle and a way of enjoying by participating at a stage when a certain number of turns have elapsed. In the former case, since the number of units that are operation targets is small, time that will be taken for game play is short and thus the user can participate at ease. Therefore, for example, the user who cannot spare time to play the game thoroughly can participate at an early stage and finish the own part of the game quickly, to expect a clearing reward thereafter. On the other hand, a user such as the user who has time to play the game thoroughly or the user who is used to the TBSG can dare to participate in the relay battle at a later stage. Thus, the user can operate a larger number of units, so that the user can enjoy the game thoroughly (the larger the number of units that can be operated is, the higher the strategic characteristic of the game is). Further, the user can enjoy in such a way that the user satisfies the victory condition of the map in the user's play, to clear the relay battle, and expects to be appreciated by the predecessors. In particular, each unit has a feature of growth as described above in the exemplary embodiment. Therefore, it is possible that, in a relay battle self-launched by a beginner (unit levels are low and it is difficult to clear the game in this combat situation), a plurality of advanced players take over and dispatch higher-level units, whereby the combat situation is reversed, ending up clearing the game. Thus, in the relay battle in the exemplary embodiment, it is possible to provide different ways of enjoying in accordance with users' play styles.

[Outlines of Various Processes Relevant to Relay Battle]

In addition, in the relay battle in the exemplary embodiment, various controls described below are further performed to improve user's convenience or amusement of the game.

[Progress Confirmation Function after Self-Launch or Taking Over]

First, in the exemplary embodiment, the user can confirm the progress state of the game after the user has finished the play of the game self-launched or taken over. For example, in a case of a self-launch user who has self-launched a relay battle, after the self-launch user has finished the own play, the self-launch user can perform a predetermined operation for "progress confirmation", whereby data of the relay battle at this point of time is received from the server and replay until that point of time is displayed. Thus, the self-launch user can confirm how the relay battle self-launched by him/herself is going on thereafter. For example, in a case where there is any taking-over user, replay for each taking-over user is sequentially displayed subsequently to replay of the self-launch user's play. Similarly, in a case where a user becomes a taking-over user, replay for each of taking-over users including said user is sequentially displayed subsequently to replay of the self-launch user. Thus, each user can confirm the progress after his/her own play, and can confirm the play of another user, whereby the user can refer to the way of another user's battle and make use of it for the future play. In a case where no other user has taken over at the time when the self-launch user has performed an operation for progress confirmation, replay for only the self-launch user is displayed. As a result of progress confirmation, in a case where the relay battle has finished with the victory condition or the defeat condition satisfied, a predetermined reward is given to the user who has performed the progress confirmation.

[Reinforcement Point]

Figure 9:
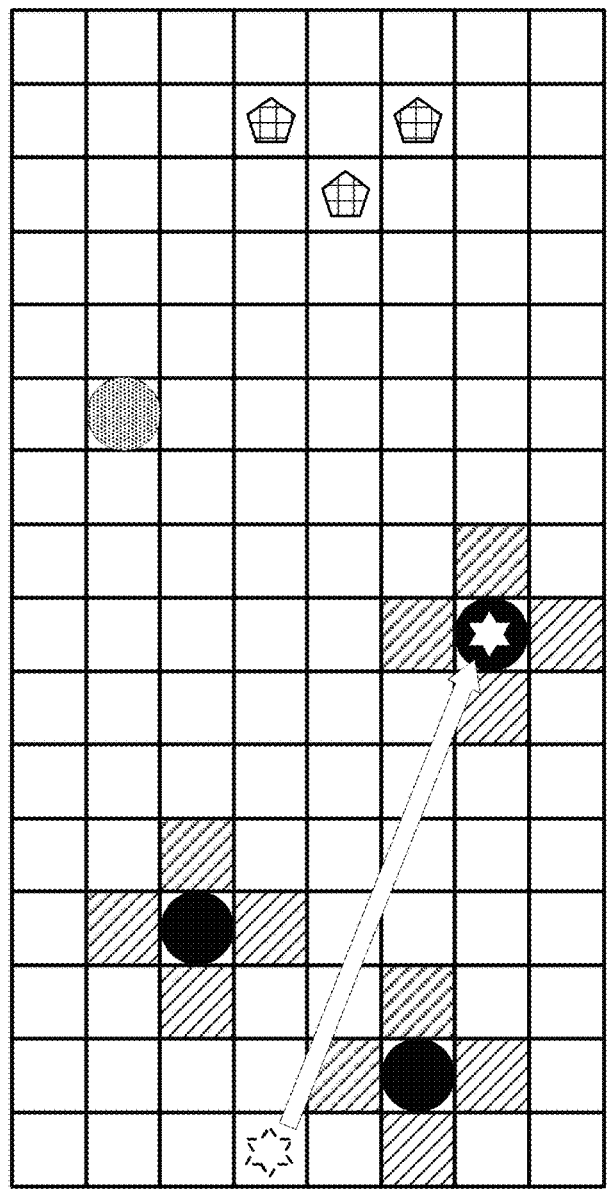
FIG. 9 is a non-limiting example of reinforcement points and reinforcement allowed cells.

Next, a placement position (dispatch position) of an own military unit will be described. First, positions (initial placement positions) where a self-launch user places own military units are determined in advance for each map used in relay battles. The self-launch user can place an own military unit at any of the determined initial placement positions. On the other hand, positions where a taking-over user can place an own military unit are a cell where a "reinforcement point" is set and four surrounding cells adjacent thereto. Hereinafter, these cells are collectively referred to as "reinforcement allowed cells". FIG. 8 shows an example of reinforcement points and reinforcement allowed cells. FIG. 8 is a schematic diagram showing an overhead view of a part of a virtual space in the TBSG in the exemplary embodiment. In FIG. 8, four reinforcement points indicated by circle marks are set. The positions of such reinforcement points are set in advance for each map. Each reinforcement point is set in either an "active" state or an "inactive" state. At the time when the relay battle is just started, only some of a plurality of reinforcement points are active and the rest are inactive. In FIG. 8, active reinforcement points are indicated by black circles, and there are two active reinforcement points and two inactive reinforcement points. Then, as the game is advanced, as shown in FIG. 9, the own military unit moves to the cell corresponding to an inactive reinforcement point and "stands by" (finishes its action), so that the state of the reinforcement point changes from an inactive state to an active state. Positions where the own military unit can be placed are the cell at such an "active" reinforcement point and four surrounding cells adjacent thereto.

Providing such reinforcement points is for changing (increasing) dispatch allowed positions in accordance with the game state (the advancement degree of the game in the relay battle). For example, in FIG. 8, a case where only the lower left one of the four reinforcement points exists is assumed. Then, as the game is advanced, the front of battle is assumed to be near the upper end in FIG. 8. In this case, when the relay battle is taken over and started, it might be difficult to put an own military unit at the battlefront. For example, if an own military unit is dispatched to the lower left reinforcement point position, the own military unit might not be able to completely move to the battlefront position within the user's play (e.g., two turns of play). On the other hand, for example, if all the four reinforcement points in FIG. 8 can be used from the initial stage of the game, it is also possible for a taking-over user to place an own military unit near a leader character (boss character) of the enemy military team, for example, soon after the relay battle has started. As a result, the game might end up unfavorable development in terms of game balance or the like. Considering the above, in the exemplary embodiment, a plurality of reinforcement points arranged away from each other to a certain extent are prepared, and it is possible to gradually increase active reinforcement points as the game is advanced. Thus, the game balance can be made appropriate. For example, such development that a boss character can be attacked from the initial stage of the relay battle can be prevented, and such game development that the battlefront is gradually moved forward can be made. When a user takes over the game advanced to a certain extent, if a reinforcement point near the battlefront has become active, the user can immediately send an own possessed unit to the battlefront and let the own dispatched unit battle at the battlefront, for example, whereby the user can enjoy the relay battle sufficiently.

[Placement Operation by Taking-Over User]

Next, a specific example of a case where a taking-over user places an own possessed unit will be described. First, on a dispatch preparation screen, if the taking-over user selects a unit to be dispatched (hereinafter, referred to as reinforcement unit), the unit is automatically placed at any of vacant reinforcement allowed cells provisionally (e.g., see FIG. 10). Thereafter, through user's operation, the placement position can be changed among vacant reinforcement allowed cells (see FIG. 11). Then, if the user issues a dispatch instruction, an own military phase is started in a state in which the reinforcement unit has been placed on the map (at predetermined reinforcement allowed cell) from the beginning. In this regard, in another exemplary embodiment, at the stage of the dispatch preparation screen, the reinforcement unit may not be actually placed on the map and the user may merely designate the unit to be dispatched. Then, actual placement thereof may be performed just after start of the first own military phase (just after dispatch instruction) in the play at this time. Alternatively, placement may be performed after several turns have elapsed, e.g., when an own military phase for the second turn has come, instead of a timing just after the start of the first own military phase. In still another exemplary embodiment, the user may be allowed to designate the timing (turn) for the unit to appear. Thus, it is possible to let the user consider strategy including the appearance timing, whereby the strategic characteristic of the game can be further improved.

Here, in a case where another unit is present at a reinforcement allowed cell, the reinforcement allowed cell is treated as not vacant (as occupied), and a reinforcement unit cannot be placed at this cell. For example, as shown in FIG. 12, in a case where four of the five reinforcement allowed cells are occupied, the taking-over user can dispatch only one reinforcement unit even if he/she can dispatch up to five of the own possessed units, for example. In addition, in a case where all the reinforcement allowed cells are occupied, the taking-over user cannot dispatch the own possessed own military units as reinforcement units (the taking-over user is to play using only the predecessor units).

Next, supplementary explanation will be given on the aforementioned "replacement". As described above, in a case where the own military units on the map have reached the dispatch upper limit number, it is possible to switch an existing own military unit to a unit of the taking-over user by "replacement". At this time, the position (placement position) where the replacing unit appears is any of vacant reinforcement allowed cells. For example, in a case of replacing a predecessor unit A with a reinforcement unit B, the reinforcement unit B appears at a vacant reinforcement allowed cell, instead of the reinforcement unit B appearing at the cell where the predecessor unit A is present. Therefore, if all the reinforcement allowed cells are occupied, there are no cells where the replacing reinforcement unit B is caused to appear, so that the "replacement" cannot be performed in this case.

In addition, supplementary explanation will be given on the timing of actually performing "replacement". In the exemplary embodiment, on the dispatch preparation screen, a replacing unit is merely designated, and actual replacement is performed when the first own military phase after dispatch has just started. In this regard, in another exemplary embodiment, "replacement" may be performed at a timing other than a timing just after dispatch, e.g., the second turn after dispatch.

In the exemplary embodiment, as described above, each unit is a human-type character and there are no overlapping characters. Therefore, among the units possessed by the taking-over user, the same character as any character that is already present on the map cannot be dispatched. In this regard, in another exemplary embodiment, the same character may be allowed to be dispatched through the above "replacement". That is, the user may be allowed to switch the character of another user to the same character possessed by the user.

[Comment Function]

Figure 13:
FIG. 13 is a non-limiting example of a comment selection screen.

Next, a comment function will be described. In the relay battle in the exemplary embodiment, it is possible to leave a comment to a user who will take over subsequently (or a possible user who might take over), when each user has finished the own play. Then, the taking-over user can see comments from users (hereinafter, predecessors) who have thus far played. Specifically, the comments are displayed at a timing when display of the above-described replay is finished before the actual play is started. Here, in the exemplary embodiment, such a comment can be selected from fixed phrases prepared in advance (in other words, the user cannot freely input a comment). Specifically, after each user has finished play for a prescribed number of turns, for example, a comment selection screen as shown in FIG. 13 is displayed. On the comment selection screen, a plurality of fixed phrases are presented as options to the user. Then, when the user has selected a predetermined one of these fixed phrases, the result data including that selection result is transmitted to the server.

The above-described comment display timing is merely an example. In another exemplary embodiment, a method other than displaying a comment with replay may be adopted. For example, comments of the predecessors may be collectively displayed at the timing when the taking-over user performs dispatch (at the start of the first own military phase for the taking-over user). Alternatively, when information of the relay battle is presented, the comments may be displayed as one of various kinds of the information.

In another exemplary embodiment, regarding the content set for the comment, a plurality of predetermined images (icon/stamp images) as well as the above fixed phrases may be presented as options, so that the user is allowed to select the image in combination with the fixed phrase.

[Reward]

Next, supplementary explanation will be given on the aforementioned reward accompanying finish of the relay battle. In the exemplary embodiment, when the relay battle is finished, all the users who have participated in the relay battle are given rewards. The grade of the reward is different between a case of finishing with the victory condition satisfied (i.e., in a case of achieving victory) and a case of finishing with the defeat condition satisfied (i.e., in a case of being defeated). Specifically, a higher-grade reward is given in a case of achieving victory than in a case of being defeated. The specific reward content may be determined by lottery. For example, a victory reward may be determined through lottery from a group of higher-grade items than in a case of a defeat reward. Other than such a method of making the grades of rewards different, the number or amount of rewards to be given may be made different. For example, while rewards are the same item or in-game currency, a victory reward may be larger in number or amount than a defeat reward. Regarding the content of the defeat reward, rewards having the same content may be uniformly given to all the participants, instead of determination by lottery. In this way, by preparing both of the victory reward and the defeat reward, it is possible to promote active participation in the relay battle, so that a situation in which the relay battle is left without anyone participating therein is less likely to occur.

Further, regarding the victory reward, the reward grade is different between a user who has satisfied the victory condition in the own performed play and a user who has not satisfied the victory condition in the own performed play. In the exemplary embodiment, the user who has satisfied the victory condition in the own performed play is given a higher-grade reward than other users. That is, the user who has finally established the victory condition is given a better reward. Thus, it is possible to provide a user with a motivation to achieve the victory condition by him/herself. That is, it is possible to provide a user with a motivation to actively participate in the relay battle in a state in which the game is advanced to a certain extent (a state in which it is considered that the battle force and the battle condition have been improved and thus the victory condition is highly likely to be satisfied).

[Details of Game Processing in Exemplary Embodiment]

Next, with reference to FIG. 14 to FIG. 28, game processing in the exemplary embodiment will be described in more detail.

[Used Data]

First, various data used in the exemplary embodiment will be described. Here, data used in the server 1 will be described first, and then data used in the game apparatus 2 will be described.

[Data Stored in Server 1]

Figures 14, 15:
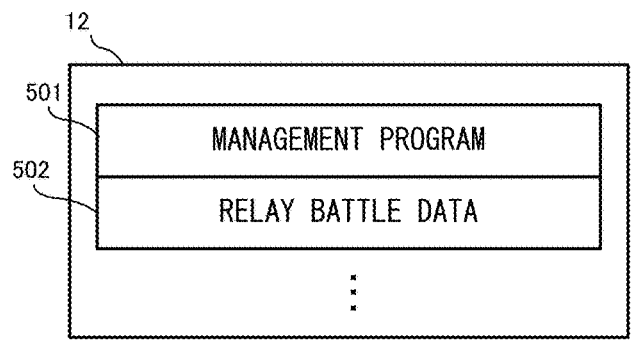
FIG. 14 is a memory map showing a non-limiting example of various data stored in a memory 12 of the server 1.
FIG. 15 is a non-limiting example of the data structure of relay battle data 502.

FIG. 14 is a memory map showing an example of various data stored in the memory 12 of the server 1. The memory 12 stores a management program 501, relay battle data 502, and the like.

The management program 501 is a program for implementing various functions executed by the server in the game processing in the exemplary embodiment. Specifically, the management program 501 is a program for executing a process shown in a flowchart in FIG. 20 described later.

The relay battle data 502 is a database for managing the relay battle in the server 1. FIG. 15 shows an example of the data structure of the relay battle data 502. The relay battle data 502 is a database formed by collection of records including at least the following contents: a battle ID 511, last update date and time 512, a map ID 513, a lock flag 514, a finish flag 515, and battle log data 516, as shown in FIG. 15.

The battle ID 511 is an ID for uniquely identifying each relay battle. The last update date and time 512 are information indicating the last update date and time of each record. The map ID 513 is information for identifying the map used in the relay battle corresponding to each record. In the exemplary embodiment, a plurality of kinds of relay battle maps are prepared, and therefore an ID for identifying any of them is stored as the map ID 513.

The lock flag 514 is a flag indicating whether or not the relay battle corresponding to each record is being played by a predetermined user. If the lock flag 514 is ON, it is indicated that play is being performed by the predetermined user. The initial value of the lock flag 514 is OFF. The finish flag 515 is a flag indicating whether or not the relay battle corresponding to each record has satisfied a finish condition. If the finish flag 515 is OFF, it is indicated that the relay battle has not satisfied the finish condition yet and can be selected as a relay battle that can be taken over. If the finish flag 515 is ON, the relay battle has finished and therefore cannot be selected as a relay battle that can be taken over. The initial value of the finish flag 515 is OFF.

The battle log data 516 is data indicating the play content (advancement state) in the relay battle corresponding to each record. Also, the battle log data 516 is collection of the above-described result data transmitted from respective game apparatuses 2. FIG. 16 shows an example of the data structure of the battle log data 516. The battle log data 516 is a database formed by collection of records including at least the following contents: a user ID 521, result data 522, and registration date and time 523. The result data 522 is data indicating each user's play content and the like, and as the result data 522, result data for transmission 608 described later transmitted from the game apparatus 2 is stored. The user ID 521 is an ID for identifying the user who has transmitted the result data 522, and the registration date and time 523 are registration date and time of the corresponding record (result data 522).

Besides, although not shown, various data and the like to be transmitted to the game apparatus 2 may be generated appropriately as necessary and stored in the memory 12. In addition, various data received from the game apparatus 2 may be temporarily stored in the memory 12.

[Data Stored in Game Apparatus 2]

Figure 17:
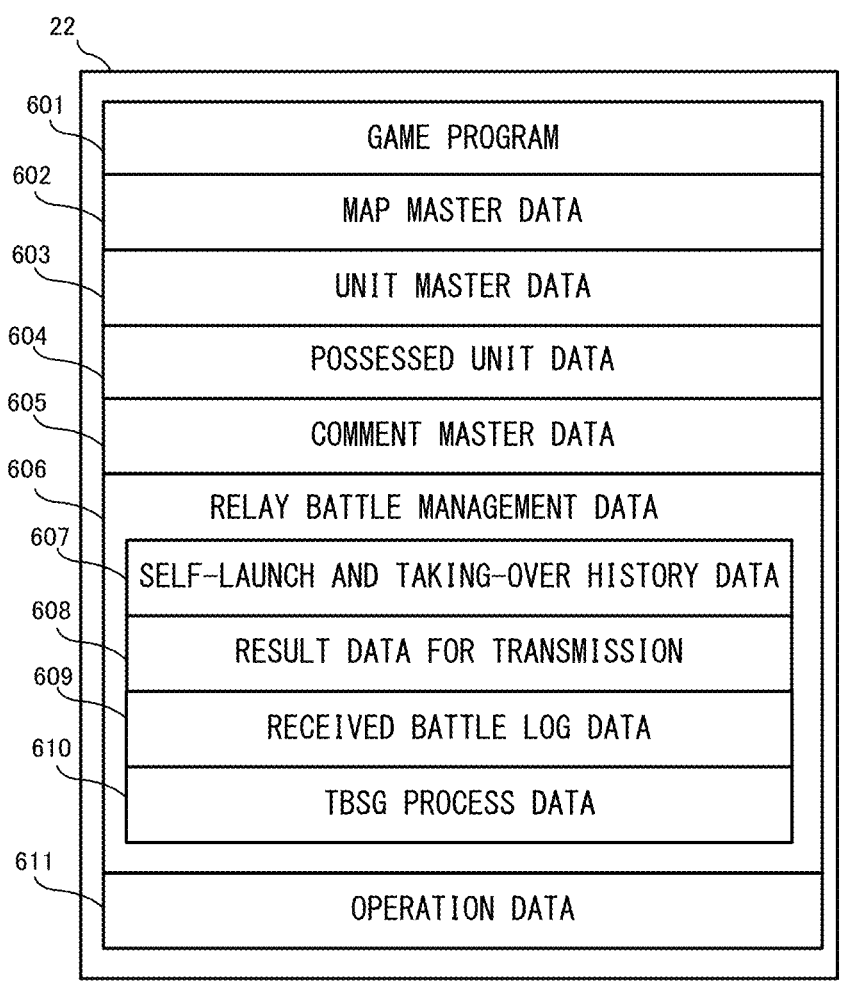
FIG. 17 is a memory map showing a non-limiting example of various data stored in a memory 22 of the game apparatus 2.

Next, data stored in the game apparatus 2 will be described. FIG. 17 is a memory map showing an example of various data stored in the memory 22 of the game apparatus 2. The memory 22 of the game apparatus 2 stores a game program 601, map master data 602, unit master data 603, possessed unit data 604, comment master data 605, relay battle management data 606, operation data 611, and the like.

The game program 601 is a program for executing the game processing in the exemplary embodiment. Specifically, the game program 601 is a program for executing a process shown in a flowchart in FIG. 21 described later.

The map master data 602 is data defining the structures of maps for the TBSG used in the first game mode and maps for the TBSG used in the second game mode. Specifically, the map master data 602 includes various kinds of information for constructing each map, such as information indicating the size (the number of cells) of each map, terrain at each cell, the outer appearance thereof, a terrain effect, and the like. Besides, the map master data 602 includes information defining the victory condition and the defeat condition for each map, and the like.

The unit master data 603 is data defining all own military units that appear in this game. In the unit master data 603, for example, information indicating a unit ID, a character name, various kinds of status information, a unit level, and an outer appearance is defined for each unit.

The possessed unit data 604 is data indicating units possessed by the user.

The comment master data 605 is data in which a plurality of fixed phrases to be used for comments as described above are stored.

The relay battle management data 606 is data used when processing for the relay battle is executed on the game apparatus 2. The relay battle management data 606 includes at least self-launch and taking-over history data 607, the result data for transmission 608, received battle log data 609, and TBSG process data 610.

Figures 18, 19:
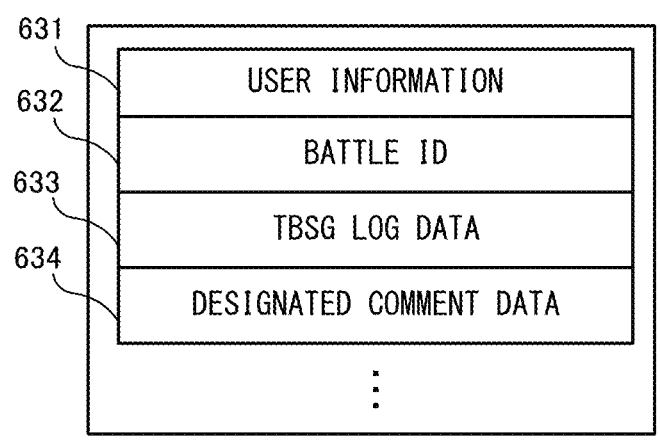
FIG. 18 is a non-limiting example of the data structure of self-launch and taking-over history data 607.
FIG. 19 is a non-limiting example of the data structure of result data for transmission 608.

The self-launch and taking-over history data 607 is data indicating the history of relay battles self-launched by the user and relay battles that the user took over (participated in). FIG. 18 is an example of the data structure of the self-launch and taking-over history data 607. The self-launch and taking-over history data 607 is a database formed by collection of records including at least the following contents: a history number 621, date and time data 622, a battle ID 623, and a reward flag 624. The history number 621 is an ID for uniquely identifying each record. The date and time data 622 is data indicating the date and time when each relay battle was self-launched or taken over. The battle ID 623 is information for identifying each relay battle self-launched or taken over, and is information corresponding to the battle ID 511 in the relay battle data 502. The reward flag 624 is a flag indicating whether or not a reward has already been given for each relay battle. The reward flag 624 is set at ON if a reward has already been given, and OFF if a reward has not been given yet.

Returning to FIG. 17, the result data for transmission 608 is data to be transmitted to the server 1, and indicates the play content in the TBSG advanced by the user on the game apparatus 2. The result data for transmission 608 (at least a part thereof) is to be stored as the result data 522 in the battle log data 516, in the server 1. FIG. 19 shows an example of the data structure of the result data for transmission 608. The result data for transmission 608 includes at least user information 631, a battle ID 632, TBSG log data 633, and designated comment data 634. The user information 631 is information for identifying the user who has transmitted the result data for transmission 608. The battle ID 632 is information for identifying the relay battle self-launched or taken over by the user, and corresponds to the battle ID 511 in the relay battle data 502. The TBSG log data 633 is data indicating the play content in the TBSG. For example, the TBSG log data 633 includes information indicating the turns in which the user has played, the user's operation content, the action content of each unit, a result of combat, and the like. The designated comment data 634 is information for identifying the comment selected by the user. Besides, the result data for transmission 608 can include information for identifying the map being used in the relay battle, information indicating the transmission date and time, and the like.

Returning to FIG. 17, next, the received battle log data 609 is data in which the battle log data 516 received from the server 1 is stored.

The TBSG process data 610 is data to be used for performing the TBSG process for the relay battle on the game apparatus 2. This data includes the position of each unit on the map, unit list data for managing the state of each unit, and the like. Regarding generation of the unit list data, in a case of playing by taking over the relay battle, the positions and the like of the existing units are determined on the basis of the received battle log data 609.

Next, the operation data 611 is data indicating the content of operation performed on the controller 4 by the player. The operation data 611 is transmitted from the controller 4 to the processor 21 at predetermined time intervals, and includes information indicating the press state of each button, information indicating the input content to the analog stick, and the like.

Besides, although not shown, various data needed for game processing, e.g., data of items and the like possessed by the user and data relevant to the first game mode, are also stored in the memory 22.

Next, the details of game processing in the exemplary embodiment will be described. Here, processing relevant to the server 1 will be described first, and then processing relevant to the game apparatus 2 will be described. In the exemplary embodiment, one or more processors read and execute the above programs stored in one or more memories, thereby implementing flowcharts shown below. The flowcharts are merely examples of processing procedures. Therefore, as long as the same result can be obtained, the processing order of steps may be changed. In addition, the values of variables, and thresholds used in determination steps, are also merely examples, and other values may be employed as necessary.

[Processing Executed by Server 1]

Figure 20:
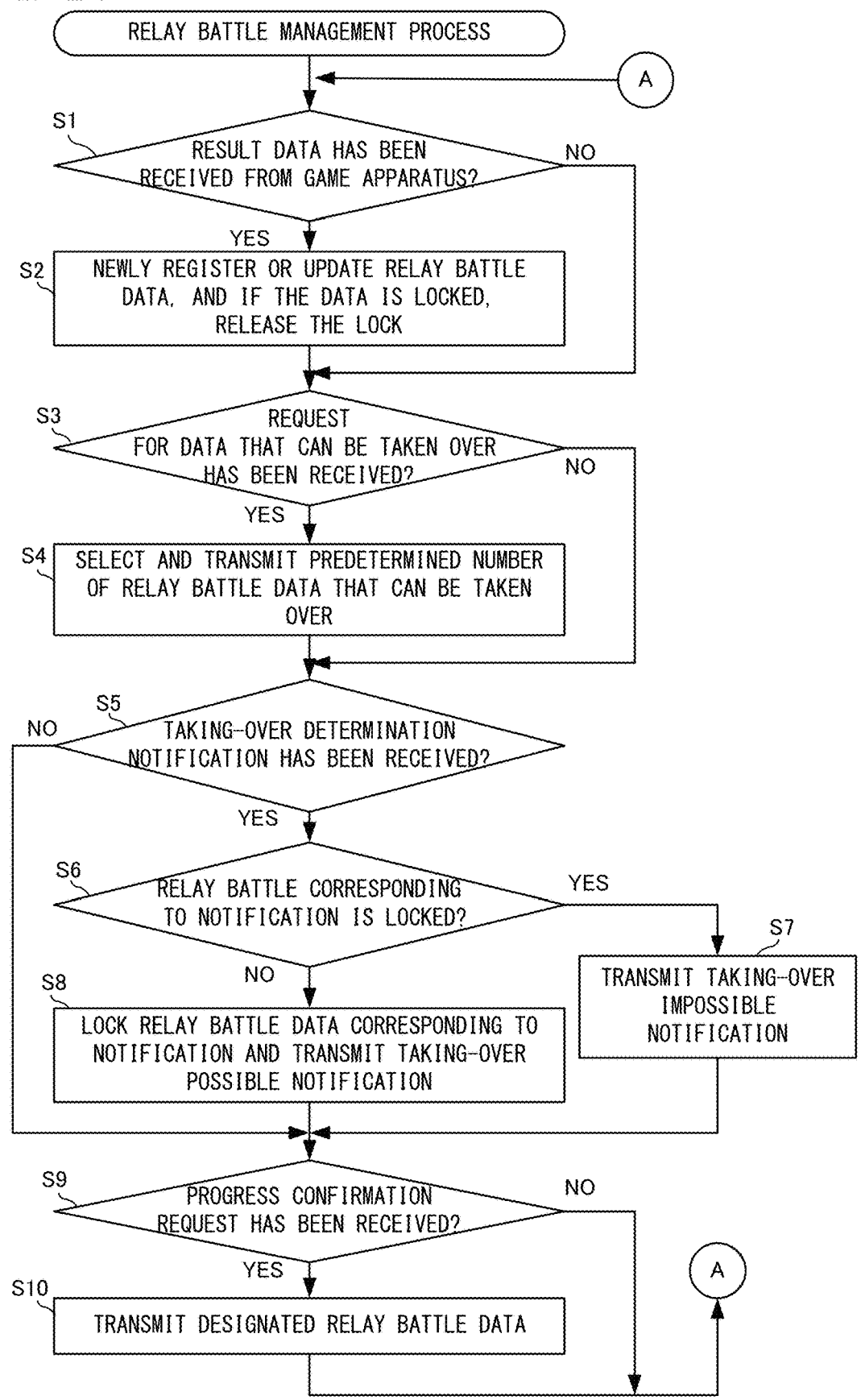
FIG. 20 is a non-limiting example of a flowchart showing the details of a relay battle management process.

FIG. 20 is a flowchart showing the details of a relay battle management process executed by the server 1. In FIG. 20, first, in step S1, the processor 11 of the server 1 determines whether or not the result data for transmission 608 has been received from a predetermined game apparatus 2. As a result of the determination, if the result data for transmission 608 has been received (YES in step S1), in step S2, the processor 11 updates the relay battle data 502 on the basis of the received data. Specifically, if the received result data for transmission 608 is about a self-launched relay battle, the processor 11 generates a new record for the relay battle on the basis of the received data and newly registers the record in the relay battle data 502. In the exemplary embodiment, in a case where a relay battle is self-launched, a battle ID is generated on the game apparatus 2 side and then is included in the result data for transmission. At this time, the battle ID is generated so as to be a unique ID, using a terminal unique number unique to each game apparatus, the user ID, or the like. Therefore, the server 1 can determine that the result data is about a self-launched relay battle if the battle ID is not present in the relay battle data 502. On the other hand, if the received result data for transmission 608 is about the relay battle taken over, the content of the relay battle data 502 is updated on the basis of the received data. Specifically, the processor 11 specifies the battle ID 511 on the basis of the received data. Then, the processor 11 adds a new record based on the received data, to the battle log data 516 of the relay battle corresponding to the specified battle ID 511. In addition, the processor 11 determines whether or not the relay battle has finished (the victory condition or the defeat condition is satisfied) on the basis of the result data for transmission 608, and if the relay battle has finished, sets the finish flag 515 to ON. Further, if the relay battle corresponding to the received result data for transmission 608 is in a locked state, the processor 11 releases the lock. That is, the processor 11 sets the lock flag 514 to OFF.

On the other hand, as a result of the determination in step S1, if the result data for transmission 608 has not been received (NO in step S1), the above processing in step S2 is skipped.

Next, in step S3, the processor 11 determines whether or not request for data of relay battles that can be taken over has been received from the predetermined game apparatus 2. As a result of the determination, if the request has been received (YES in step S3), in step S4, the processor 11 refers to the relay battle data 502 and selects a predetermined number of relay battles for which the finish flags 515 are OFF (relay battles that can be taken over). The selection method is not particularly limited. Then, data about the selected relay battles is transmitted to the game apparatus 2 that has transmitted the above request.

On the other hand, as a result of the determination in step S3, if request for data of relay battles that can be taken over has not been received (NO in step S3), the above processing in step S4 is skipped.

Next, in step S5, the processor 11 determines whether or not a taking-over determination notification has been received from the predetermined game apparatus 2. This notification is transmitted from a predetermined game apparatus as a result of an operation for a predetermined user to determine to take over a predetermined relay battle. As a result of the determination, if a taking-over determination notification has not been received (NO in step S5), the process proceeds to step S9 described later. On the other hand, if a taking-over determination notification has been received (YES in step S5), next, in step S6, the processor 11 determines whether or not the relay battle designated as a target to be taken over in this notification is in a locked state at present, on the basis of the lock flag 514. This is for considering a case where different users determine to take over the relay battle almost at the same timing, for example. In addition, this is also for considering a case where, while a user is confirming (e.g., watching replay) information about a predetermined relay battle, another user determines to take over that relay battle, for example. As a result of the determination, if the designated relay battle is in a locked state (YES in step S6), in step S7, the processor 11 transmits a taking-over impossible notification to the game apparatus 2 that has transmitted the above taking-over determination notification. Then, the process proceeds to step S9 described later.

On the other hand, if the designated relay battle is not in a locked state (NO in step S6), in step S8, the processor 11 sets, to ON, the lock flag 514 corresponding to the relay battle designated by the taking-over determination notification. Further, the processor 11 transmits a taking-over possible notification to the game apparatus 2 that has transmitted the above taking-over determination notification.

Next, in step S9, the processor 11 determines whether or not a progress confirmation request has been received from the predetermined game apparatus 2. The progress confirmation request is a request for data for progress confirmation as described above. As a result of the determination, if a progress confirmation request has been received (YES in step S9), in step S10, the processor 11 acquires data about the relay battle designated by the progress confirmation request, from the relay battle data 502. Then, the processor 11 transmits the data to the game apparatus 2 that has transmitted the above request. Then, the process returns to step S1, so as to be repeated.

On the other hand, as a result of the determination in step S9, if a progress confirmation request has not been received (NO in step S9), the processing in step S10 is skipped.

Thus, description of the processing executed by the server 1 has finished.

[Processing Executed by Game Apparatus 2]

Next, processing executed by the game apparatus 2 will be described. Here, only processing relevant to the relay battle (relay battle relevant process) will be described, while description about other game processing is omitted.

Figure 21:
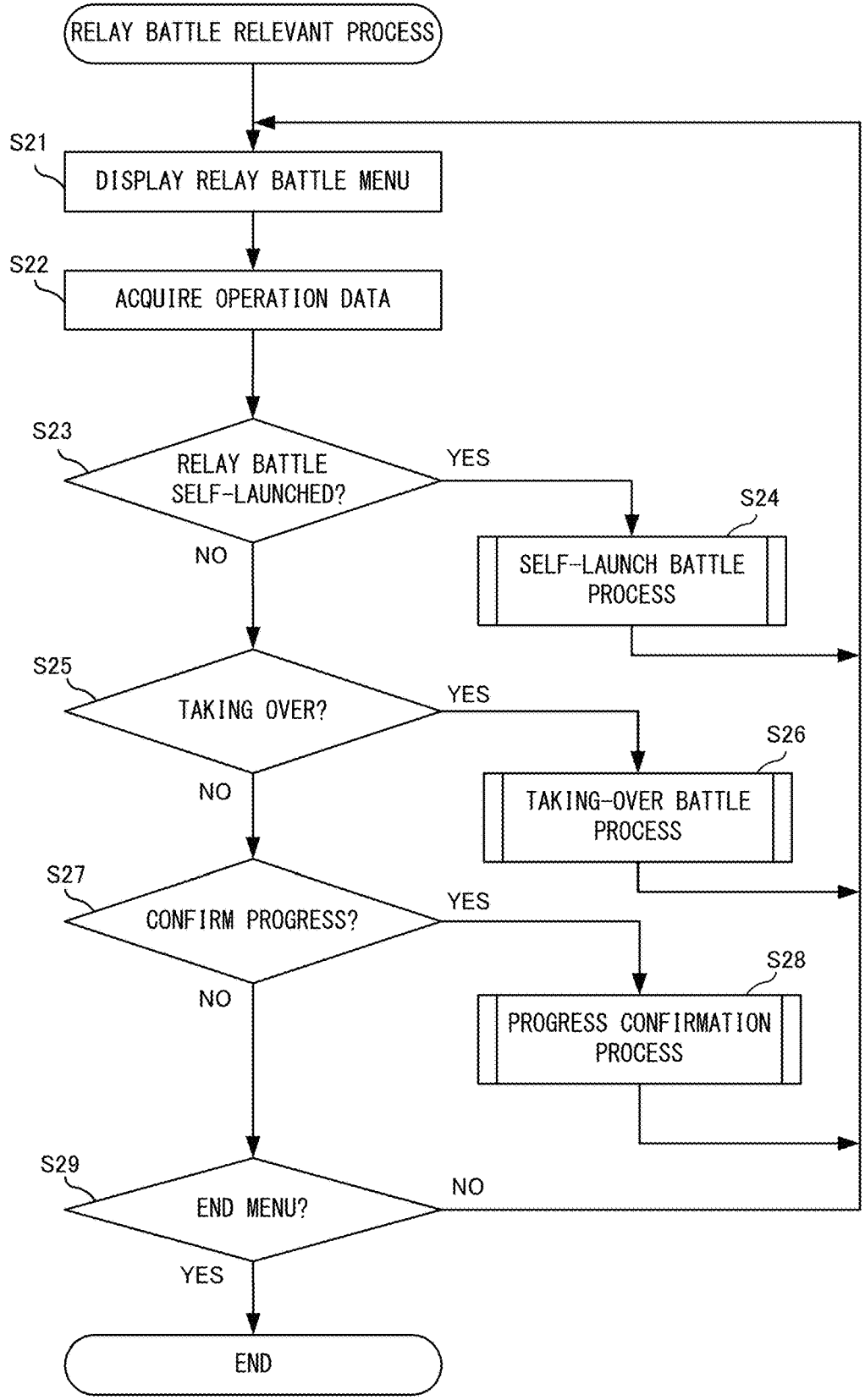
FIG. 21 is a non-limiting example of a flowchart showing the details of a relay battle relevant process.
Figure 22:
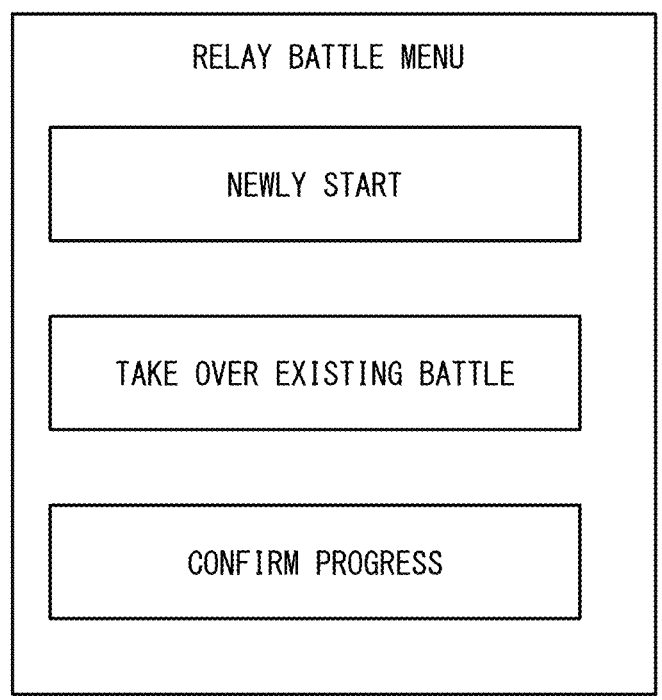
FIG. 22 is a non-limiting example of a relay battle menu.

FIG. 21 is a flowchart showing the details of the relay battle relevant process to be executed by the game apparatus 2. First, in step S21, the processor 21 of the game apparatus 2 displays a relay battle menu as shown in FIG. 22, for example.

Next, in step S22, the processor 21 acquires the operation data 611. Then, in step S23, the processor 21 determines whether or not an operation of self-launching a relay battle has been performed on the relay battle menu, on the basis of the operation data 611. As a result of the determination, if a self-launch operation has been performed (YES in step S23), in step S24, the processor 21 executes a self-launch battle process.

FIG. 23 is a flowchart showing the details of the self-launch battle process. First, in step S31, the processor 21 displays a map selection screen on which maps designated for relay battles are shown as a list, on the basis of the map master data 602.

Next, in step S32, the processor 21 acquires the operation data 611. Then, in step S33, the processor 21 determines whether or not any of the maps has been selected, on the basis of the operation data 611. If none of the maps has been selected (NO in step S33), the process returns to step S31, so as to be repeated.

Figure 24:
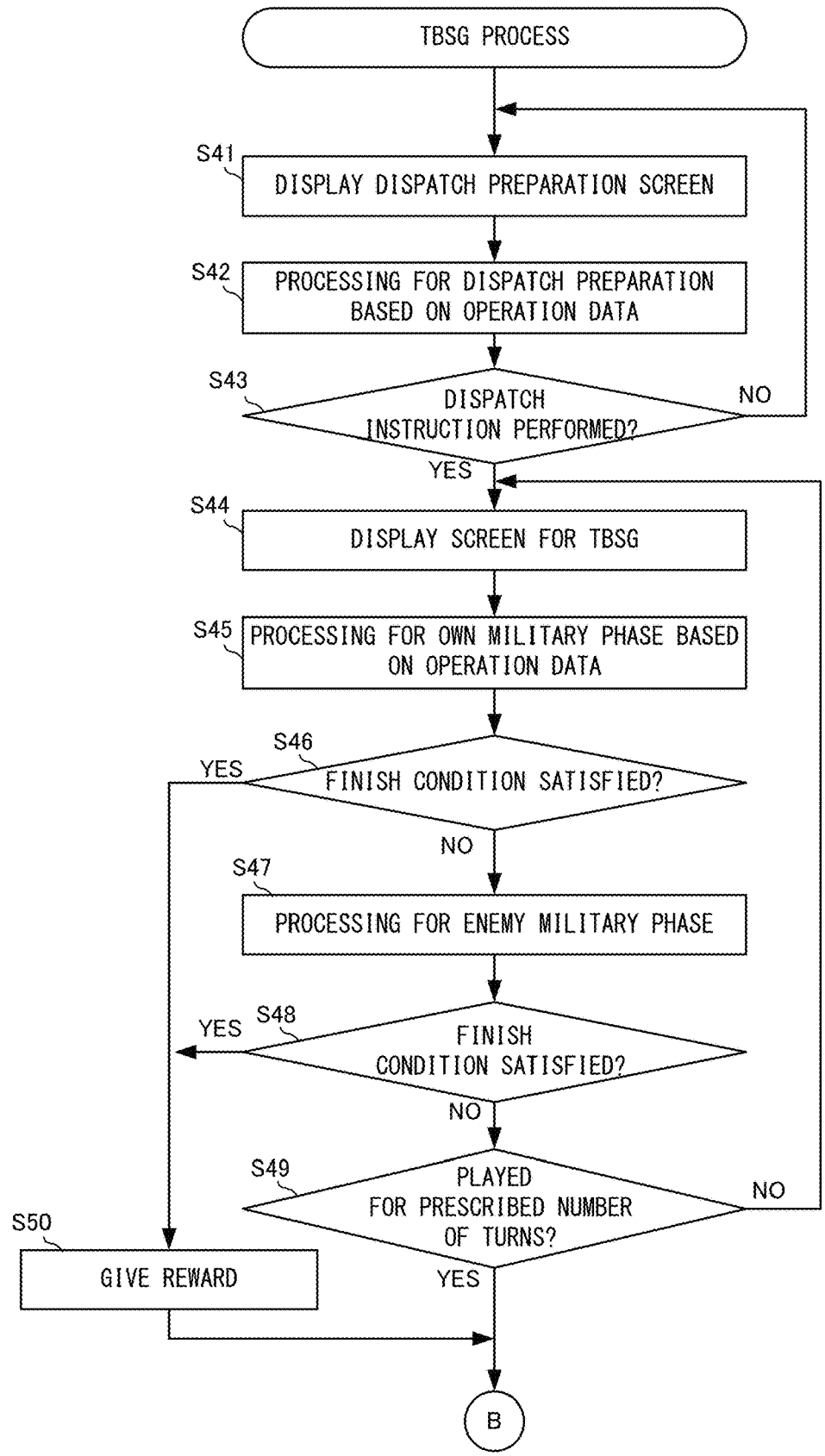
FIG. 24 is a non-limiting example of a flowchart showing the details of a TBSG process.
Figure 25:
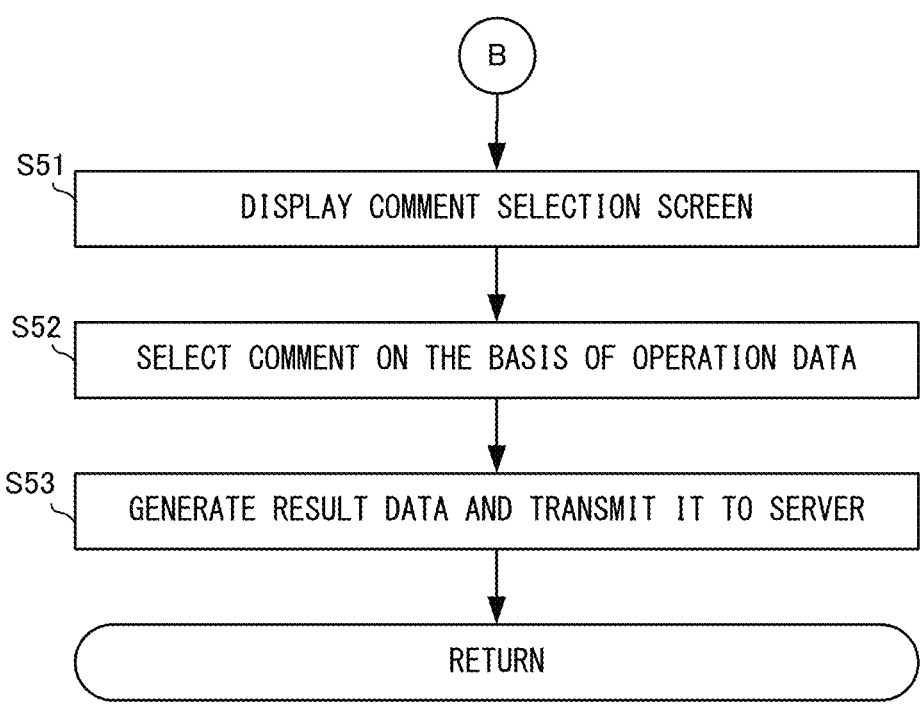
FIG. 25 is a non-limiting example of a flowchart showing the details of the TBSG process.

On the other hand, if any of the maps has been selected (YES in step S33), in step S34, the processor 21 executes a TBSG process using the selected map. FIG. 24 and FIG. 25 are flowcharts showing the details of the TBSG process. First, in step S41, the processor 21 reads data of the selected map from the map master data 602, and generates and displays a dispatch preparation screen (not shown) on the basis of the read data. At this time, in a case of playing by taking over, the processor 21 generates a dispatch preparation screen in which the battle condition (such as positions of the own military team and the enemy military unit) at the time of taking over is reflected, on the basis of the received battle log data 609.

Next, in step S42, the processor 21 acquires the operation data 611. Further, the processor 21 executes various processes relevant to dispatch preparation, on the basis of the operation content indicated in the operation data 611. Specifically, processing for determining a unit to be dispatched, processing for determining the placement position thereof, and the like are executed. Regarding the placement position, as described above, the unit is automatically placed at the reinforcement allowed cell provisionally, and then the placement position thereof can be changed on the basis of a user's operation.

Next, in step S43, the processor 21 determines whether or not a dispatch instruction has been performed on the dispatch preparation screen, on the basis of the operation data 611. If a dispatch instruction has not been performed (NO in step S43), the process returns to step S41, so as to be repeated.

On the other hand, if a dispatch instruction has been performed (YES in step S43), in step S44, the processor 21 ends the dispatch preparation screen and displays a screen for the TBSG (see FIG. 4). At this time, in a case of self-launch, on the displayed screen, an own military team and an enemy military unit are placed at predetermined initial placement positions, with the operation content on the dispatch preparation screen reflected. On the other hand, in a case of taking over, on the displayed screen, the battle condition (such as positions of the own military team and the enemy military unit) at the time of taking over is reflected on the basis of the received battle log data 609, and the operation content on the dispatch preparation screen is further reflected.

Next, in step S45, the processor 21 acquires the operation data 611 and executes processing for an own military phase on the basis of the operation content. Specifically, the processor 21 executes processing of moving an own military unit on the basis of the operation data 611, processing of performing combat against a predetermined enemy military unit, and the like. In addition, in order to generate the result data for transmission 608 later, the processor 21 temporarily stores, in the memory 22, the content of a user's operation and the action content of the own military unit in the own military phase (operation log and action log), and the like. In addition, the processor 21 generates and displays a game screen (battle scene, etc.) in which the above processing based on the operation content is reflected, as appropriate.

Next, in step S46, the processor 21 determines whether or not the finish condition (victory condition or defeat condition) set on the map where play is being performed at present is satisfied. If the finish condition is not satisfied (NO in step S46), in step S47, the processor 21 executes processing for an enemy military phase. Specifically, the processor 21 causes an enemy military unit to act through AI control. In addition, in order to generate the result data for transmission 608 later, the processor 21 temporarily stores, in the memory 22, the action content of the enemy military unit in the enemy military phase, and the like.

Next, in step S48, the processor 21 determines whether or not the finish condition is satisfied. If the finish condition is not satisfied (NO in step S48), in step S49, the processor 21 determines whether or not a prescribed number of turns have elapsed since the start of the present play. In the exemplary embodiment, since the prescribed number of turns is 2 as an example, whether or not play for two turns has finished since the start of play by the self-launch user or the taking-over user is determined. As a result of the determination, if the prescribed number of turns have not elapsed (NO in step S49), the process returns to step S44, so as to be repeated. On the other hand, if the prescribed number of turns have elapsed (YES in step S49), the process proceeds to step S51 described later.

On the other hand, as a result of the determination in step S46 or step S48, if it is determined that the finish condition is satisfied (YES in step S46 or step S48), in step S50, the processor 21 gives a predetermined reward corresponding to the play result, to the user who has satisfied the finish condition. Specifically, data indicating items possessed by the user is updated. The reward corresponding to the play result, i.e., the grade of the given reward, is as described above. Thereafter, the process proceeds to step S51 described below.

Next, in step S51 in FIG. 25, the processor 21 ends the TBSG screen and displays a comment selection screen (see FIG. 13). Next, in step S52, the processor 21 acquires the operation data 611, and selects a predetermined comment from the comment selection screen on the basis of the operation content.

Next, in step S53, the processor 21 generates the result data for transmission 608 and transmits the result data for transmission 608 to the server 1. Specifically, on the basis of the data temporarily stored in step S45 and S47 above, the processor 21 generates the TBSG log data 633 indicating the content of user's operation and the action content of each unit in the own military phase and the enemy military phase, and the like. Also in a case where the finish condition has been satisfied in the play at this time, data indicating the play content until reaching the finish condition is generated as the TBSG log data 633. Further, the processor 21 generates the designated comment data 634 on the basis of the selected comment. In addition, in a case where the play of the TBSG at this time is self-launched play, the processor 21 generates the battle ID 632 using, for example, the terminal unique number or the user ID (so as to make a unique ID). On the other hand, in a case of performing play by taking over, information of the battle ID included in the received battle log data 609 is directly used as it is. Then, the processor 21 generates the result data for transmission 608 with the user information 631 set as appropriate, and transmits the result data for transmission 608 to the server 1. Then, the processor 21 ends the TBSG process.

Returning to FIG. 23, next, in step S35, the processor 21 updates the self-launch and taking-over history data 607. Specifically, the processor 21 generates a record in which a new history number 621 and the battle ID 623 indicating the relay battle self-launched at this time are set, and adds the record to the self-launch and taking-over history data 607. Here, in a case where a reward has been given in step S50 in the play at this time, the processor 21 adds the record with the reward flag 624 set at ON. On the other hand, in a case where a reward has not been given, the processor 21 adds the record with the reward flag 624 set at OFF. Then, the processor 21 ends the self-launch battle process.

Returning to FIG. 21, when the self-launch battle process is ended, the process returns to step S21, so as to be repeated.

On the other hand, as a result of the determination in step S23, if a self-launch operation has not been performed (NO in step S23), in step S25, the processor 21 determines whether or not an operation of taking over a relay battle has been performed on the relay battle menu, on the basis of the operation data 611. As a result of the determination, if a taking-over operation has been performed (YES in step S25), in step S26, the processor 21 executes a taking-over battle process.

Figure 26:
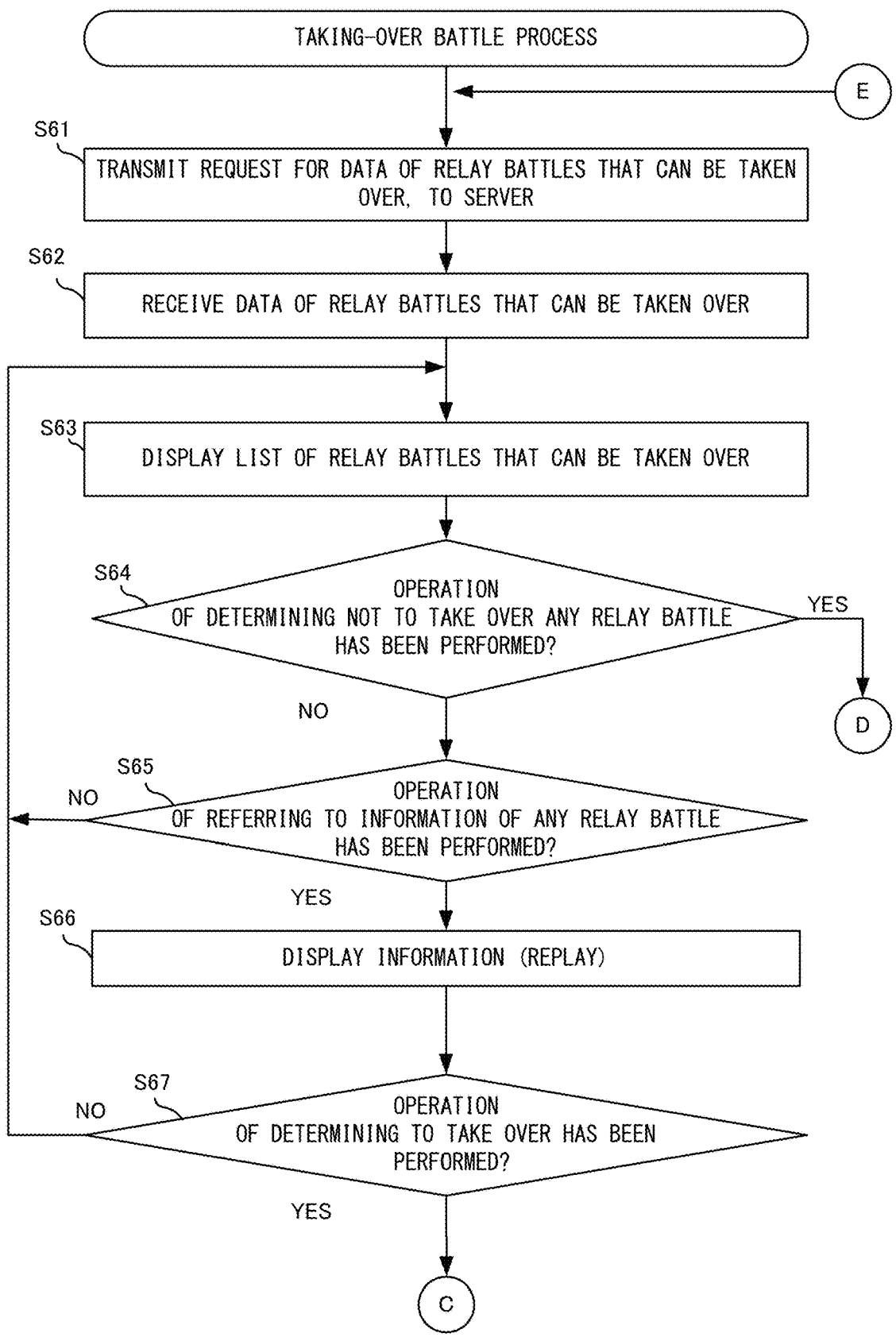
FIG. 26 is a non-limiting example of a flowchart showing the details of a taking-over battle process.
Figure 27:
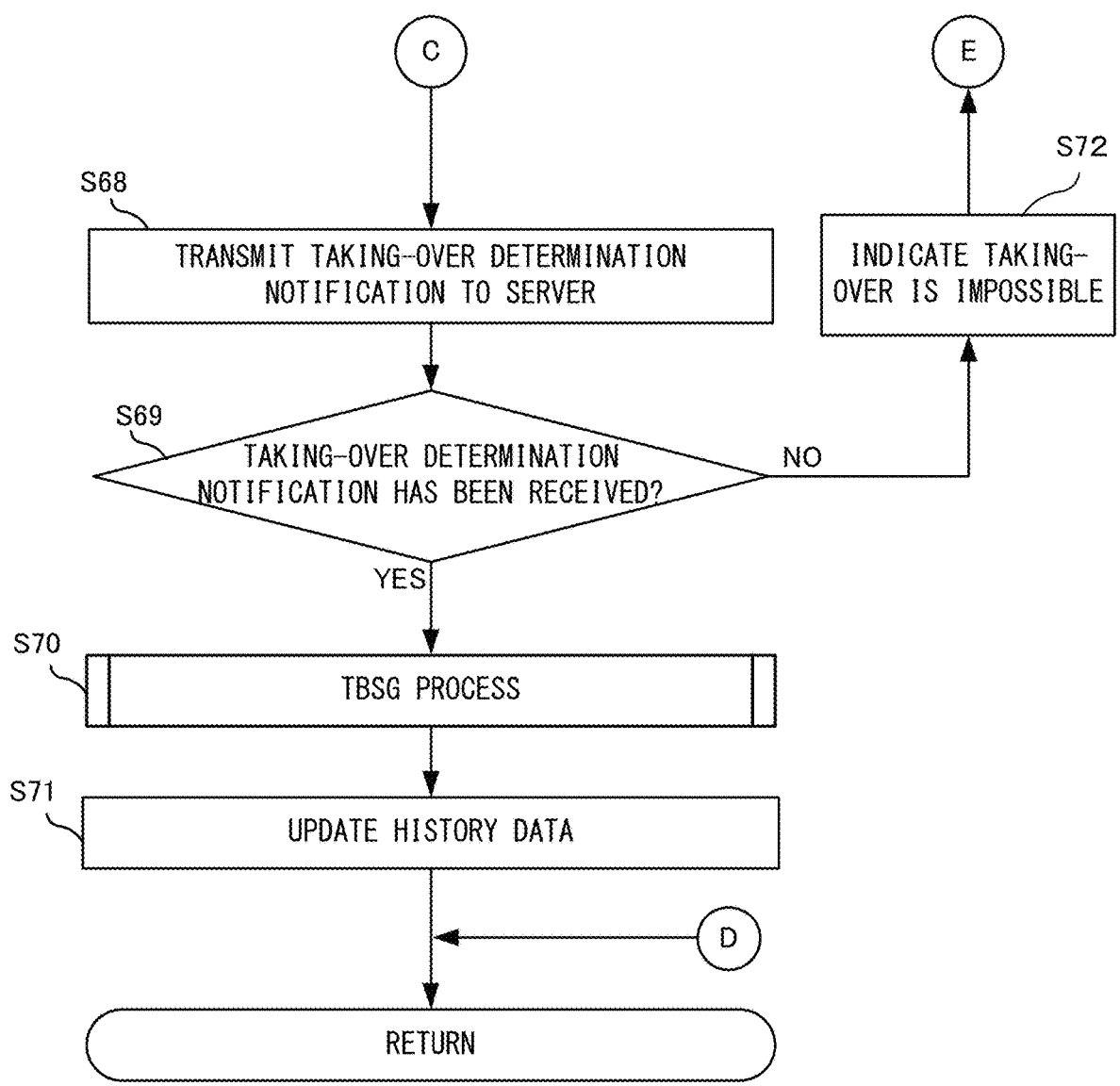
FIG. 27 is a non-limiting example of a flowchart showing the details of the taking-over battle process.

FIG. 26 and FIG. 27 are flowcharts showing the details of the taking-over battle process. First, in step S61, the processor 21 transmits request for data of relay battles that can be taken over, to the server. Next, in step S62, the processor 21 receives data of relay battles transmitted from the server 1 in accordance with the above request. Further, the processor 21 generates the received battle log data 609 on the basis of the received data (e.g., copies each battle log data 516 included in the received data to the received battle log data 609).

Next, in step S63, on the basis of the received data of relay battles, the processor 21 generates and displays a list of the received relay battles.

Next, in step S64, the processor 21 acquires the operation data 611 and determines whether or not an operation of determining to not take over any of the relay battles displayed on the list has been performed. As a result of the determination, if an operation of determining to not take over any of the relay battles has been performed (YES in step S64), the processor 21 ends the taking-over battle process. In another exemplary embodiment, in the above case, the process may return to step S61, to request data of other relay battles (i.e., may perform processing of updating the list).

On the other hand, if an operation of determining to not take over any of the relay battles has not been performed (NO in step S64), next, in step S65, the processor 21 acquires the operation data 611 and determines whether or not an operation of referring to information about any of the relay battles from the list. As a result of the determination, if an operation of referring to the information has not been performed (NO in step S65), the process returns to step S63, so as to be repeated. On the other hand, if an operation of referring to the information has been performed (YES in step S65), in step S66, the processor 21 displays the information about the selected relay battle on the basis of the received battle log data 609. Specifically, the number of turns that have elapsed thus far, information about dispatched own military units and enemy military units, the states of reinforcement points, and the like are displayed. Further, on the basis of the received battle log data 609, replay of game progress thus far is also displayed. In addition, the comment set by each predecessor is also displayed at a timing when replay for each predecessor is finished. For example, in a case where there are three predecessors and the prescribed number of turns is two, the comment of the first predecessor is displayed when replay for the first and second turns from the start of the relay battle is finished, the comment of the second predecessor is displayed when replay for the third and fourth turns is finished, and the comment of the third predecessor is displayed when replay for the fifth and sixth turns is finished.

Next, in step S67, the processor 21 determines whether or not an operation of determining to take over one of the relay battles has been performed, on the basis of the operation data 611. As a result of the determination, if an operation of determining to take over has not been performed (NO in step S67), the process returns to step S63, so as to be repeated. On the other hand, if an operation of determining to take over has been performed (YES in step S67), in step S68 in FIG. 27, the processor 21 transmits a taking-over determination notification including information designating the relay battle determined to be taken over, to the server 1.

Next, in step S69, the processor 21 determines whether or not a taking-over possible notification has been received from the server 1. As a result of the determination, if a taking-over possible notification has not been received (a taking-over impossible notification described above has been received) from the server 1 (NO in step S69), in step S72, the processor 21 displays an indication that it is impossible to take over. Then, the process returns to step S61, so as to be repeated.

On the other hand, if a taking-over possible notification has been received (YES in step S69), next, in step S70, the processor 21 executes a TBSG process. This process is the same as the process in step S34 described above, and therefore the description thereof is omitted.

Next, in step S71, the processor 21 updates the self-launch and taking-over history data 607. Specifically, the processor 21 generates a record in which the battle ID 623 indicating the relay battle taken over at this time is set, and adds the record to the self-launch and taking-over history data 607. In addition, similarly as described above, in a case where a reward has been given in the play at this time, the processor 21 adds the record with the reward flag 624 set at ON. Then, the processor 21 ends the taking-over battle process.

Returning to FIG. 21, when the taking-over battle process is ended, the process returns to step S21, so as to be repeated.

On the other hand, as a result of the determination in step S25, if an operation of taking over a relay battle has not been performed (NO in step S25), in step S27, the processor 21 determines whether or not an operation for progress confirmation has been performed on the relay battle menu, on the basis of the operation data 611. As a result of the determination, if an operation for progress confirmation has been performed (YES in step 27), in step S28, the processor 21 executes a progress confirmation process.

Figure 28:
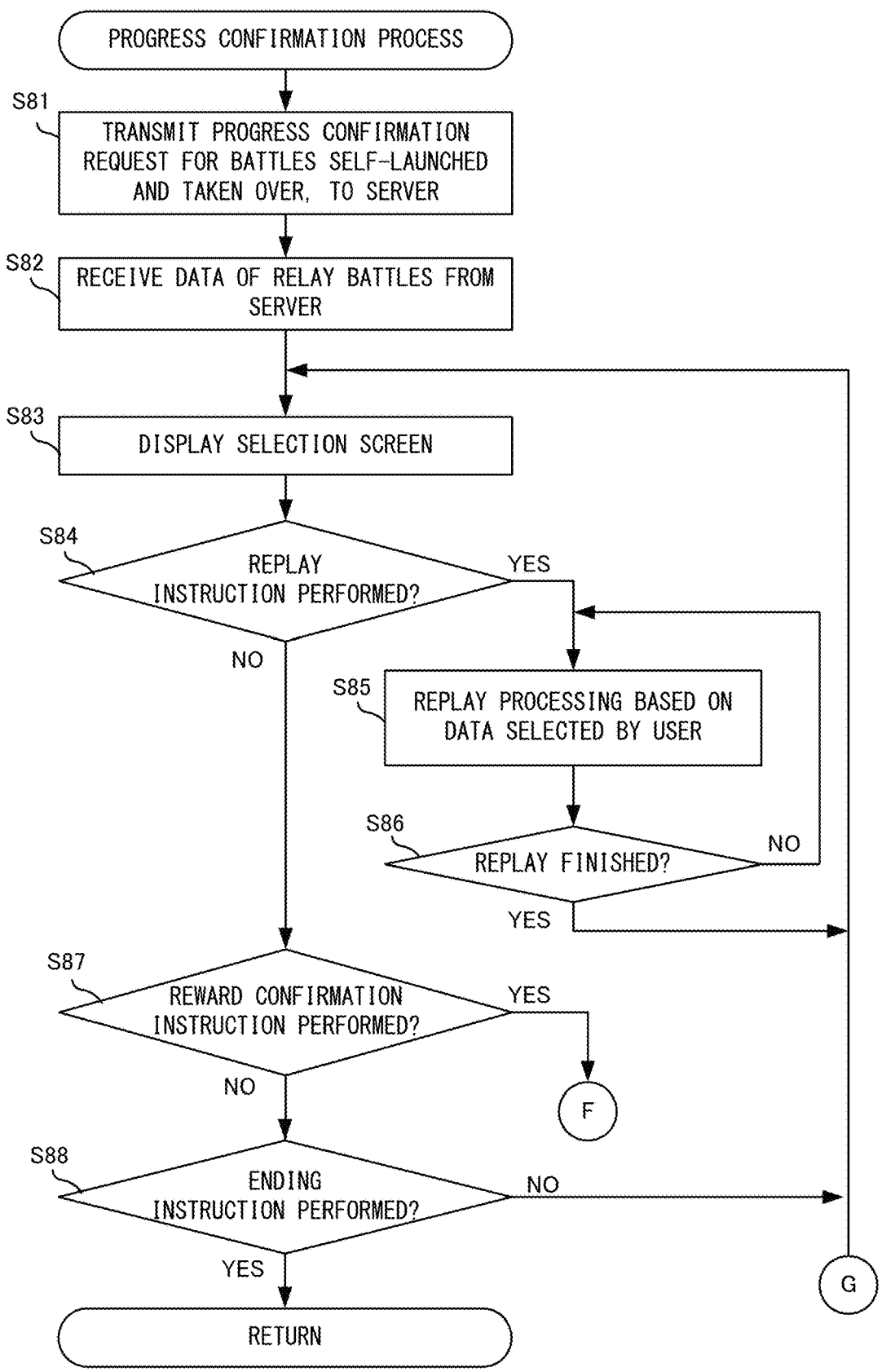
FIG. 28 is a non-limiting example of a flowchart showing the details of a progress confirmation process.

FIG. 28 is a flowchart showing the details of the progress confirmation process. First, in step S81, the processor 21 refers to the self-launch and taking-over history data 607, and transmits a progress confirmation request designating the battle ID 623 of one or more relay battles self-launched or taken over by the user, to the server 1.

Next, in step S82, the processor 21 receives data of the relay battles transmitted from the server 1 in accordance with the above request.

Next, in step S83, the processor 21 generates and displays a screen for selecting a relay battle for which progress confirmation is requested, on the basis of the received data of the relay battles. Although not shown, on this screen, the relay battles self-launched or taken over by the user are displayed as a list. In displaying the relay battles as a list, predetermined images (icons or the like) may be displayed together with images indicating the relay battles so that the user can discriminate a relay battle of which a reward has not been given yet, a relay battle of which a reward has already been given, and a relay battle that has not finished yet.

Next, in step S84, the processor 21 acquires the operation data 611, and determines whether or not an instruction operation to start replay of any of the relay battles has been performed, on the basis of the operation content. As a result of the determination, if an instruction operation to start replay has been performed (YES in step S84), in step S85, the processor 21 performs replay processing on the basis of data of the relay battle selected by the user.

Next, in step S86, the processor 21 determines whether or not the replay processing in step S85 has finished. For example, when the replay is displayed until the end or when an instruction to cancel the replay has been received from the user during the replay, the replay processing is determined to have finished. As a result of the determination, if the replay processing has not finished (NO in step S86), the processor 21 returns to step S85, to continue the replay processing. On the other hand, if the replay processing has finished (YES in step S86), the process returns to step S83, so as to be repeated.

On the other hand, as a result of the determination in step S84, if an instruction to start replay has not been performed (NO in step S84), in step S87, the processor 21 acquires the operation data 611 and determines whether or not an instruction to confirm a reward of any of the relay battles has been performed, on the basis of the operation content. As a result of the determination, if an instruction to confirm a reward has not been performed (NO in step S87), next, in step S88, the processor 21 determines whether or not an operation of ending the progress confirmation process has been performed, on the basis of the operation data 611. If the ending operation has not been performed (NO in step S88), the process returns to step S83, so as to be repeated. If the ending operation has been performed (YES in step S88), the processor 21 ends the progress confirmation process.

Figure 29:
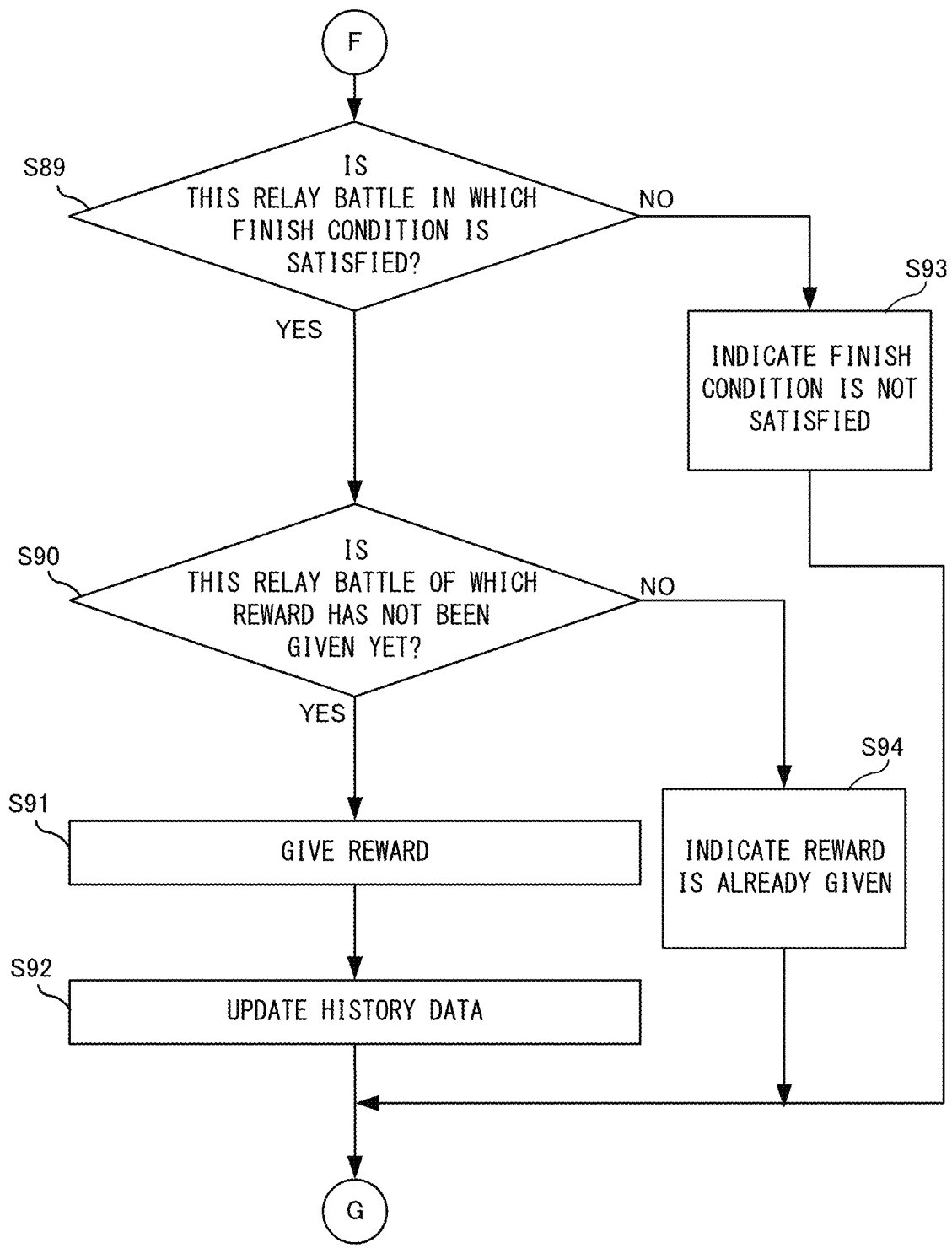
FIG. 29 is a non-limiting example of a flowchart showing the details of the progress confirmation process.

On the other hand, as a result of the determination in step S87, if an instruction to confirm a reward has been performed (YES in step S87), in step S89 in FIG. 29, the processor 21 determines whether or not the relay battle for which the reward confirmation instruction has been performed is a relay battle in which the finish condition has been satisfied, on the basis of the finish flag 515. As a result of the determination, if the finish condition has not been satisfied in the relay battle yet (NO in step S89), in step S93, the processor 21 displays an indication that the relay battle has not finished yet. Then, the process returns to step S83.

On the other hand, if the finish condition has been satisfied in the relay battle (YES in step S89), in step S90, the processor 21 determines whether or not the relay battle for which the reward confirmation instruction has been performed is a relay battle of which a reward has not been given yet, on the basis of the reward flag 624. As a result of the determination, if this relay battle is a relay battle of which a reward has not been given yet (YES in step S90), in step S91, the processor 21 executes processing of giving a reward. In this case, the same processing as in step S50 is executed. Determination for victory/defeat as a premise for giving the reward may be determined on the basis of the battle log data 516 in the received relay battle data 502. In this regard, in another exemplary embodiment, when the relay battle has finished, information indicating whether the relay battle has finished with victory or defeat may be sent by being included in the result data for transmission 608, and may be registered in the server 1. In this case, as information indicating the finish state of the relay battle, for example, "finish state data" indicating any of "not finished", "victory", or "defeat" may be used instead of the finish flag 515. Then, in the processing in step S87, the processor 21 may refer to the finish state data and determine whether to give a victory reward or a defeat reward.

Next, in step S92, the processor 21 updates the self-launch and taking-over history data 607. Specifically, the processor 21 sets, to ON, the reward flag 624 corresponding to the confirmed relay battle.

On the other hand, as a result of the determination in step S90, if this relay battle is a relay battle of which a reward has already been given (NO in step S90), in step S94, the processor 21 displays an indication that the reward has already been given. Then, the process returns to step S83.

Returning to FIG. 21, if the progress confirmation process is ended, the process returns to step S21, so as to be repeated.

On the other hand, as a result of the determination in step S27, if a progress confirmation operation has not been performed (NO in step S27), in step S29, the processor 21 determines whether or not an operation of ending the relay battle menu has been performed, on the basis of the operation data 611. As a result of the determination, if an operation of ending the relay battle menu has not been performed (NO in step S29), the process returns to step S21, so as to be repeated. If an operation of ending the relay battle menu has been performed (YES in step S29), the processor 21 ends the relay battle relevant process.

Thus, the detailed description of the game processing in the exemplary embodiment has finished.

As described above, the exemplary embodiment provides cooperative multiplay in which different users perform operations in an own military phase by a predetermined number of turns for each user, on one map in a TBSG, while aiming at clearing the game. As it were, the exemplary embodiment provides such novel multiplay that commanders in a battle field take turns to continue a battle. Thus, it is possible to provide a user with such a way of enjoying that a plurality of users cooperate to beat a formidable enemy, for example.

In addition, when participating in the relay battle, a taking-over user can dispatch an own possessed unit that has been grown in the first game mode. Thus, it is also possible to provide such a way of enjoying by mutually showing an own possessed unit grown by each user among a plurality of users.

Further, in the exemplary embodiment, since the relay battle can be played while being taken over, for example, even if a self-launch user is not good at the TBSG, it is possible to eventually clear the game (and obtain a victory reward) while a taking-over user who is good at TBSG takes over the play or a taking-over user dispatches a stronger unit, for example. Thus, also a user who is not good at the TBSG and a beginner user can participate at ease and enjoy the TBSG. In addition, also a user who does not like competition between users can enjoy game play with a plurality of users owing to the cooperative play manner.

By the way, in a case where a user plays by directly taking over the game played by another user without synchronization with the other user's game state, it is considered that, depending on the advancement state of the game, the future game development has been already directed by the other user's play and thus there is little room for the user to intervene in the game advancement. In this regard, in the exemplary embodiment, it is possible to additionally dispatch an own possessed unit at the time of taking over, as described above. Therefore, there is room to greatly change the game development directed by the other user's play. Thus, tactics that can be employed by the user increase, leading to improvement in amusement of the game.

In the exemplary embodiment, at the time of taking over a relay battle, the battle performed thus far is presented through replay. Therefore, even in a case of participating in the relay battle part-way through, the user can determine strategy, tactics, and the like to be taken after that, e.g., which unit is appropriate to dispatch. Thus, the strategic characteristic of the TBSG is improved, so that amusement thereof is improved. In addition, even after participating in the relay battle, the user can confirm progress after that through the above-described replay. Owing to such a replay function, the way of other user's battle (play) can be watched, so that the possibility of, for example, obtaining a new finding or noticing something new, increases. As a result of obtaining a new finding or noticing something new, the user can try a new way of battle, for example, and thus amusement of the game can be further improved.

As described above, it is possible to provide two ways of enjoying, i.e., a way of enjoying by participating at an early stage after a relay battle is self-launched, and a way of enjoying by participating at a stage when a certain number of turns have elapsed. Thus, it is possible to provide appropriate ways of enjoying in accordance with the play style of the user.

[Modifications]

The above exemplary embodiment has shown the example in which any user can take over the game after a relay battle is self-launched. In another exemplary embodiment, when a self-launched relay battle is registered in the server 1, the registration may be made such that users who can take over are limited. For example, in transmission of the result data to the server 1, it may be possible to transmit the result data including such setting that only other users who are registered as "friends" by the self-launch user can take over. Alternatively, the result data may be transmitted with a password set for the self-launched relay battle. Then, at the time of taking over the relay battle, a taking-over user may be required to input the password.

The above exemplary embodiment has shown the example in which, after a relay battle is self-launched, advancement of the game is finished once when a prescribed number of turns have elapsed, and the result data thereof is transmitted. In this regard, in another exemplary embodiment, after a relay battle is started by self-launch, advancement of the game may be finished at a timing when a predetermined time such as ten minutes has elapsed, for example. Alternatively, advancement of the game may be finished at a timing when a predetermined in-game event occurs. In other words, play may be allowed to be continued until the finish condition is satisfied, as long as a predetermined in-game event is prevented from occurring. Examples of predetermined in-game events are a case where a mid-boss character disposed on the map is beaten and a case where a character is placed at a predetermined position on the map.

The processing order of the processing of finishing game advancement and the processing of transmitting the result data is not limited to the above example, and either processing may be performed first or both processes may be performed in parallel. The result data may be transmitted every time one turn is finished, for example.

In the above exemplary embodiment, prepared relay battles (maps thereof) may include such a relay battle (map thereof) that, after a user has self-launched the relay battle, the self-launch person can clear the game (or be defeated) without anyone taking over. Then, when the game is finished without anyone taking over, a reward is given but the processing of transmitting the result data to the server 1 may be omitted. This is because there is no need for taking over and therefore there is no need for transmitting the result data.

The above exemplary embodiment has shown the example in which a taking-over user can take over the same relay battle only once and a self-launch user also cannot take over the self-launched relay battle by him/herself. In another exemplary embodiment, the same user may be allowed to take over the relay battle a plurality of times unless he/she takes over consecutively. For example, after a relay battle self-launched by a user A is taken over by a user B and then is taken over by a user C, the user B may be allowed to take over the relay battle again. In addition, as long as another user such as the user B or the user C takes over the relay battle, also the self-launch user A may be allowed to take over the own self-launched battle by him/herself after the other user has taken over.

The above exemplary embodiment has shown the example in which the timing of temporarily locking the relay battle data so as not to be selected as a relay battle that can be taken over is when a taking-over determination notification is received from the game apparatus 2. In this regard, in another exemplary embodiment, for example, control may be performed such that, at a timing of transmitting a plurality of listed relay battle data to the game apparatus 2, all the listed relay battle data may be locked. In addition, when a taking-over determination notification has been received from a predetermined game apparatus 2, another game apparatus to which the relay battle designated by the above notification has been already transmitted as a candidate of a relay battle that can be taken over, may be notified that said relay battle can no longer be taken over. Then, the notified game apparatus may immediately display this fact after having received this notice. For example, while a user is watching replay of a predetermined relay battle, if another user determines to take over the relay battle, such an indication that "this relay battle was taken over by another user" may be displayed as a pop-up.

After the relay battle data is locked as described above, it is assumed that this state is left without the above prescribed number of turns elapsing (the result data is not transmitted no matter how much time passes). Considering such a case, a period during which the relay battle data is locked may be limited. For example, in a case where more than 24 hours has passed since a certain relay battle was locked, processing may be performed to forcibly set the lock flag 514 to OFF. As a case where a relay battle is left as described above, it is conceivable that play is stopped because of battery exhaustion in the game apparatus 2 or the like before play for the above prescribed number of turns is finished, and thus a play result cannot be transmitted, for example.

The above exemplary embodiment has shown the example in which the predecessor units can also be operated by each user. However, in another exemplary embodiment, the predecessor units may be subjected to AI control. Thus, labor of operating the predecessor units can be omitted, leading to improvement in user's convenience.

The above exemplary embodiment has shown the example in which each user can leave a comment when the user's play is finished. Regarding the comment, it may be necessary to leave a comment, or each user may be allowed to arbitrarily leave a comment.

The above exemplary embodiment has shown the example in which the number of turns for which a self-launch user plays and the number of turns for which a taking-over user plays (the above prescribed number of turns) are the same. However, both numbers of turns may be different. For example, a self-launch user may play for five turns and a taking-over user may play for three turns.

In the above exemplary embodiment, the TBSG having characters that can be grown by users has been described as an example of a game. The processing for cooperative play as described above is also applicable to games in which players alternate turns to advance the game, e.g., shogi, Go, and chess. However, depending on games, it might be impossible to add a character (piece) or the like possessed by a user at the time of taking over.

The above exemplary embodiment has shown the example in which the relay battle relevant process is executed by a single game apparatus 2. In another exemplary embodiment, the relay battle relevant process may be executed by an information processing system including a plurality of information processing terminals. For example, in an information processing system including a terminal-side apparatus and a server-side apparatus that can communicate with the terminal-side apparatus via a network, a part of the relay battle relevant process may be executed by the server-side apparatus. Alternatively, in an information processing system including a terminal-side apparatus and a server-side apparatus that can communicate with the terminal-side apparatus via a network, major processing of the above-described series of processes may be executed by the server-side apparatus, and a part of the processes may be executed by the terminal-side apparatus. In such an information processing system, a system on the server side may include a plurality of information processing terminals, and processing to be executed on the server side may be executed by the plurality of information processing terminals in a shared manner. In addition, a so-called cloud gaming configuration may be adopted. For example, the game apparatus 2 may transmit operation data indicating a user's operation to a predetermined server, various game processes may be executed on the server, and the execution result may be delivered as video and sound by streaming to the game apparatus 2.

While the present disclosure has been described herein, it is to be understood that the above description is, in all aspects, merely an illustrative example, and is not intended to limit the scope thereof. It is to be understood that various modifications and variations can be made without deviating from the scope of the present disclosure.

What is claimed is:

1. A computer-readable non-transitory storage medium having stored therein a game program for executing a game on an information processing terminal of a user, the program causing a computer of the information processing terminal to:
   on the basis of a first start instruction input from the user, start the game that is based on predetermined initial setting data and uses a user character of the user;
   advance the game started by the first start instruction input, on the basis of an operation input from the user;
   at a first timing after the game is started by the first start instruction input, finish advancement of the game, and transmit advancement state data indicating an advancement state of the game at the first timing, to a server;
   on the basis of a second start instruction input from the user, start the game that is based on the advancement state data transmitted to the server by another information processing terminal operated by another user different from the user and acquired from the server by the information processing terminal of the user, the game using an other-user character having been used in the game by the other user and the user character of the user;
   on the basis of an operation input from the user, advance the game started on the basis of the second start instruction input;
   at a second timing after the game is started on the basis of the second start instruction input, finish advancement of the game, and transmit advancement state data indicating an advancement state of the game at the second timing, to the server; and
   in a case where a victory condition of the game is satisfied by a time when the second timing has come, transmit advancement state data indicating an advancement state of the game until the victory condition is satisfied, to the server.

2. The computer-readable non-transitory storage medium according to claim 1, wherein the game is a turn-based strategy game, the first timing is a timing when a first turn number of turns have elapsed since start of the game by the first start instruction input, and the second timing is a timing when a second turn number of turns have elapsed since start of the game by the second start instruction input.

3. The computer-readable non-transitory storage medium according to claim 2, wherein when the game is in a phase of the user, the game is advanced on the basis of an operation by the user, and when the game is in a phase of an opponent, the game is advanced on the basis of an operation by the computer based on AI control, and one turn in a count of each of the first turn number and the second turn number is determined to have elapsed when one turn in the phase of the user and one turn in the phase of the opponent have finished.

4. The computer-readable non-transitory storage medium according to claim 1, wherein the game started by the first start instruction input is advanced through control of the user character in a virtual space being performed on the basis of the operation input from the user, and the game started by the second start instruction input is advanced through control of the user character and the other-user character in the virtual space being performed on the basis of the operation input from the user.

5. The computer-readable non-transitory storage medium according to claim 4, wherein in a case of starting the game by the second start instruction input, the game is started with the user character of the user placed at a predetermined position in the virtual space determined on the basis of the acquired advancement state data.

6. The computer-readable non-transitory storage medium according to claim 5, wherein in a case of starting the game by the second start instruction input, the user character is placed at a reinforcement allowed position set in advance as a position where the user character is allowed to be placed, and a number of the reinforcement allowed positions is changeable in accordance with an advancement state of the game.

7. The computer-readable non-transitory storage medium according to claim 1, wherein in the game started by the first start instruction input and/or the game started by the second start instruction input, a plurality of options prepared in advance are presented to the user when advance of the game is finished, in transmitting the advancement state data, in a case where any of the plurality of options is designated by the user, option data regarding the designated option is transmitted to the server in association with the advancement state data, and in a case of starting the game by the second start instruction input, if there is the option data associated with the advancement state data acquired from the server, an image based on the option data is outputted.

8. The computer-readable non-transitory storage medium according to claim 1, wherein in a case of starting the game by the second start instruction input, replay indicating progress of the game until the first timing or the second timing is outputted before start of the game, on the basis of the advancement state data acquired from the server.

9. The computer-readable non-transitory storage medium according to claim 8, wherein in a case of starting the game by the second start instruction input, the game is started if the second start instruction input is performed by the user, after the replay is outputted.

10. The computer-readable non-transitory storage medium according to claim 1, wherein in the game started by the first start instruction input or the game started by the second start instruction input, after advancement of the game is finished, if an advancement state confirmation instruction input is performed by the user, the advancement state data is acquired from the server in accordance with the advancement state confirmation instruction input, and replay indicating progress of the game is outputted on the basis of the advancement state data.

11. The computer-readable non-transitory storage medium according to claim 1, the game program further causing the computer to:

if the victory condition of the game is satisfied by the time when the second timing has come, give the user a first reward based on the satisfaction of the victory condition of the game; and after the information processing terminal of the user transmits the advancement state data based on the game to the server, if the advancement state of the game by the other user satisfies the victory condition of the game, give the user a second reward whose value is lower than that of the first reward.

12. The computer-readable non-transitory storage medium according to claim 11, wherein if the defeat condition is satisfied by the time when the second timing has come, the advancement state data until the defeat condition is satisfied is transmitted to the server, the game program further causing the computer to, if the defeat condition of the game is satisfied by the time when the second timing has come, give the user a third reward which is based on the satisfaction of the defeat condition of the game and whose value is lower than that of the first reward.

13. The computer-readable non-transitory storage medium according to claim 1, the game program further causing the computer to execute a game application including the game that is started by the first start instruction input or the second start instruction input, and a growth game that is different from the game and allows the user character to be grown, wherein in a case of starting the game by the first start instruction input and in a case of starting the game by the second start instruction input, the game using the user character grown in the growth game is started.

14. The computer-readable non-transitory storage medium according to claim 13, wherein in a case of starting the game by the second start instruction input, if a number of the other-user characters having been used in the game by the other user has reached a predetermined number, the game is started without causing the user character of the user to appear in the game or the game is started with the other-user character replaced with the user character.

15. The computer-readable non-transitory storage medium according to claim 1, wherein in a case of starting the game by the first start instruction input, the game using a user character selected by the user from a plurality of user characters is started, and in a case of starting the game by the second start instruction input, the game using the other-user character having been used in the game by the other user and a user character different from the other-user character among the plurality of user characters, is started.

16. The computer-readable non-transitory storage medium according to claim 1, wherein in transmitting the advancement state data at the first timing, the advancement state data is transmitted to the server in a state in which a range of the other users allowed to acquire the advancement state data is designated on the basis of an operation input from the user.

17. A game system having a server and a plurality of information processing terminals, the game system comprising a processor and a memory coupled thereto, the processor being configured to control the game system to at least execute:

causing a computer of a first information processing terminal to on the basis of a first start instruction input from a first user, start the game that is based on predetermined initial setting data and uses a user character of the first user, advance the game started by the first start instruction input, on the basis of an operation input from the first user, at a first timing after the game is started by the first start instruction input, finish advancement of the game, and transmit advancement state data indicating an advancement state of the game at the first timing, to a server, on the basis of a second start instruction input from the first user, start the game that is based on the advancement state data transmitted to the server by a second information processing terminal operated by a second user different from the first user and acquired from the server by the first information processing terminal, the game using a user character of the second user having been used in the game by the second user and the user character of the first user, on the basis of an operation input from the first user, advance the game started on the basis of the second start instruction input, at a second timing after the game is started on the basis of the second start instruction input, finish advancement of the game, and transmit advancement state data indicating an advancement state of the game at the second timing, to the server, and in a case where a victory condition of the game is satisfied by a time when the second timing has come, transmit advancement state data indicating an advancement state of the game until the victory condition is satisfied, to the server.

18. A game apparatus comprising a processor and a memory coupled thereto, the processor being configured to at least perform control to:

on the basis of a first start instruction input from the user, start the game that is based on predetermined initial setting data and uses a user character of the user;

advance the game started by the first start instruction input, on the basis of an operation input from the user;

at a first timing after the game is started by the first start instruction input, finish advancement of the game, and transmit advancement state data indicating an advancement state of the game at the first timing, to a server;

on the basis of a second start instruction input from the user, start the game that is based on the advancement state data transmitted to the server by another information processing terminal operated by another user different from the user and acquired from the server by the information processing terminal of the user, the game using an other-user character having been used in the game by the other user and the user character of the user;

on the basis of an operation input from the user, advance the game started on the basis of the second start instruction input;

at a second timing after the game is started on the basis of the second start instruction input, finish advancement of the game, and transmit advancement state data indicating an advancement state of the game at the second timing, to the server; and in a case where a victory condition of the game is satisfied by a time when the second timing has come, transmit advancement state data indicating an advancement state of the game until the victory condition is satisfied, to the server.

19. A game processing method to be executed by a computer of an information processing terminal of a user, the method causing the computer to:

on the basis of a first start instruction input from the user, start the game that is based on predetermined initial setting data and uses a user character of the user;

advance the game started by the first start instruction input, on the basis of an operation input from the user;

at a first timing after the game is started by the first start instruction input, finish advancement of the game, and transmit advancement state data indicating an advancement state of the game at the first timing, to a server;

on the basis of a second start instruction input from the user, start the game that is based on the advancement state data transmitted to the server by another information processing terminal operated by another user different from the user and acquired from the server by the information processing terminal of the user, the game using an other-user character having been used in the game by the other user and the user character of the user;

on the basis of an operation input from the user, advance the game started on the basis of the second start instruction input;

at a second timing after the game is started on the basis of the second start instruction input, finish advancement of the game, and transmit advancement state data indicating an advancement state of the game at the second timing, to the server; and in a case where a victory condition of the game is satisfied by a time when the second timing has come, transmit advancement state data indicating an advancement state of the game until the victory condition is satisfied, to the server.

20. The game processing method according to claim 19, wherein the game is a turn-based strategy game, the first timing is a timing when a first turn number of turns have elapsed since start of the game by the first start instruction input, and the second timing is a timing when a second turn number of turns have elapsed since start of the game by the second start instruction input.

* * * * *